United States Patent
Ishikawa et al.

(10) Patent No.: US 9,532,018 B2
(45) Date of Patent: Dec. 27, 2016

(54) PROJECTION SYSTEM, DEVICE AND METHOD FOR THE OUTPUT OF CALIBRATION PROJECTION SCENES

(71) Applicants: Masaaki Ishikawa, Kanagawa (JP); Yukinaka Uchiyama, Tokyo (JP)

(72) Inventors: Masaaki Ishikawa, Kanagawa (JP); Yukinaka Uchiyama, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 153 days.

(21) Appl. No.: 14/341,094

(22) Filed: Jul. 25, 2014

(65) Prior Publication Data

US 2015/0029465 A1    Jan. 29, 2015

(30) Foreign Application Priority Data

Jul. 26, 2013   (JP) .................................. 2013-155719

(51) Int. Cl.
*H04N 9/31*    (2006.01)
*G06T 7/00*    (2006.01)
(Continued)

(52) U.S. Cl.
CPC ............ *H04N 9/3147* (2013.01); *G03B 21/13* (2013.01); *G03B 37/04* (2013.01); *G06K 9/2036* (2013.01);
(Continued)

(58) Field of Classification Search
CPC .. H04N 9/3147; H04N 9/3185; H04N 9/3188; H04N 9/3191; H04N 9/3194
See application file for complete search history.

(56) References Cited

U.S. PATENT DOCUMENTS 6,456,339 B1 *   9/2002   Surati .................. G03B 37/04
                                                        348/744
6,558,006 B2    5/2003   Ioka
(Continued)

FOREIGN PATENT DOCUMENTS

JP          3497805         2/2004
JP       2004-282712      10/2004
(Continued)

OTHER PUBLICATIONS

U.S. Appl. No. 14/191,846, filed Feb. 27, 2014.

*Primary Examiner* — Bao-Luan Le
(74) *Attorney, Agent, or Firm* — Oblon, McClelland, Maier & Neustadt, L.L.P.

(57) ABSTRACT

A projection system includes projection units configured to project an image on a projection body; a preparing unit configured to prepare calibration-use images; an extraction unit configured to extract, from each of the calibration-use images, at least grating points indicating a distortion in a projected image of one of the projection units and alignment points of the projected image of the one of the projection units or another one of the projection units; a conversion unit configured to convert, onto a common coordinate system, the grating points of the projected images of the projection units extracted from the calibration-use images, based on alignment points common to the calibration-use images; and a geometric correction coefficient calculation unit configured to calculate a geometric correction coefficient for providing a projection image to be projected from the projection units, based on the grating points on the common coordinate system.

11 Claims, 24 Drawing Sheets

(51) Int. Cl.
  *G06K 9/46* (2006.01)
  *G06T 3/00* (2006.01)
  *G06K 9/20* (2006.01)
  *G06K 9/62* (2006.01)
  *G03B 21/13* (2006.01)
  *G03B 37/04* (2006.01)
  *G09G 5/00* (2006.01)

(52) U.S. Cl.
  CPC ........... *G06K 9/4676* (2013.01); *G06K 9/6206* (2013.01); *G06T 3/005* (2013.01); *G06T 7/0028* (2013.01); *G09G 5/00* (2013.01); *H04N 9/3185* (2013.01); *H04N 9/3188* (2013.01); *H04N 9/3194* (2013.01)

(56) References Cited

U.S. PATENT DOCUMENTS

| | | | | |
|---|---|---|---|---|
| 6,733,138 B2* | 5/2004 | Raskar | | H04N 9/12 345/32 |
| 6,834,965 B2* | 12/2004 | Raskar | | G03B 21/26 348/222.1 |
| 7,019,713 B2* | 3/2006 | Hereld | | H04N 9/12 345/1.1 |
| 7,237,911 B2* | 7/2007 | Yamada | | G03B 21/56 348/383 |
| 7,357,517 B2* | 4/2008 | Hasegawa | | G03B 37/04 345/1.3 |
| 7,740,361 B2* | 6/2010 | Jaynes | | H04N 9/3147 345/1.3 |
| 7,763,836 B2* | 7/2010 | Webb | | G09G 3/002 250/208.1 |
| 7,893,393 B2* | 2/2011 | Webb | | G03B 21/00 250/208.1 |
| 7,901,095 B2* | 3/2011 | Xiao | | H04N 9/3147 345/644 |
| 7,926,957 B2* | 4/2011 | Miyazawa | | G03B 21/10 348/745 |
| 8,328,365 B2* | 12/2012 | Sun | | H04N 9/12 353/69 |
| 8,550,635 B2 | 10/2013 | Kotani | | |
| 8,777,418 B2* | 7/2014 | Wright | | G03B 21/14 353/121 |
| 9,039,194 B2* | 5/2015 | Tannhauser | | H04N 9/3147 345/634 |
| 9,195,121 B2* | 11/2015 | Sajadi | | G03B 21/14 |
| 2003/0052837 A1* | 3/2003 | Raskar | | H04N 9/12 345/32 |
| 2004/0085256 A1* | 5/2004 | Hereld | | H04N 9/12 345/1.1 |
| 2004/0169827 A1 | 9/2004 | Kubo et al. | | |
| 2004/0184011 A1* | 9/2004 | Raskar | | G03B 21/26 353/94 |
| 2005/0110959 A1* | 5/2005 | Miyazawa | | G03B 21/10 353/94 |
| 2005/0206857 A1* | 9/2005 | Yamada | | G03B 21/56 353/94 |
| 2006/0181685 A1* | 8/2006 | Hasegawa | | G03B 37/04 353/69 |
| 2007/0171380 A1* | 7/2007 | Wright | | G03B 21/14 353/69 |
| 2007/0268306 A1* | 11/2007 | Webb | | G09G 3/002 345/600 |
| 2007/0273795 A1* | 11/2007 | Jaynes | | H04N 9/3147 348/745 |
| 2008/0129967 A1* | 6/2008 | Webb | | G03B 21/00 353/121 |
| 2009/0279001 A1* | 11/2009 | Miyazawa | | G03B 21/10 348/745 |
| 2010/0245684 A1* | 9/2010 | Xiao | | H04N 9/3147 348/745 |
| 2010/0277655 A1* | 11/2010 | Sun | | H04N 9/3147 348/744 |
| 2011/0211065 A1* | 9/2011 | Furui | | G03B 21/14 348/135 |
| 2012/0098937 A1* | 4/2012 | Sajadi | | G03B 21/14 348/46 |
| 2012/0120372 A1* | 5/2012 | Timoner | | G06T 5/006 353/31 |
| 2013/0169888 A1* | 7/2013 | Tannhauser | | H04N 9/3188 348/745 |
| 2013/0222386 A1* | 8/2013 | Tannhauser | | G06T 3/4038 345/428 |
| 2013/0222776 A1 | 8/2013 | Ishikawa | | |
| 2014/0226028 A1* | 8/2014 | Wright | | G03B 21/14 348/189 |

FOREIGN PATENT DOCUMENTS

| | | |
|---|---|---|
| JP | 3908255 | 4/2007 |
| JP | 2011-182076 | 9/2011 |
| JP | 2012-047849 | 3/2012 |

\* cited by examiner

FIG.17A

| PROJECTOR COORDINATES (INTEGER) | | CONTENT COORDINATES (DECIMAL POINT) | |
|---|---|---|---|
| X | Y | X | Y |
| 0 | 0 | ... | ... |
| 1 | 0 | ... | ... |
| 2 | 0 | ... | ... |
| ... | 0 | ... | ... |
| 1279 | 0 | ... | ... |
| 0 | 1 | ... | ... |
| 1 | 1 | ... | ... |
| 2 | 1 | ... | ... |
| ... | ... | ... | ... |
| 1277 | 799 | ... | ... |
| 1278 | 799 | ... | ... |
| 1279 | 799 | ... | ... |

FIG.17B

| PROJECTOR COORDINATES (INTEGER) | | BLENDING COEFFICIENT |
|---|---|---|
| X | Y | |
| 0 | 0 | ... |
| 1 | 0 | ... |
| 2 | 0 | ... |
| ... | 0 | ... |
| 1279 | 0 | ... |
| 0 | 1 | ... |
| 1 | 1 | ... |
| 2 | 1 | ... |
| ... | ... | ... |
| 1277 | 799 | ... |
| 1278 | 799 | ... |
| 1279 | 799 | ... |

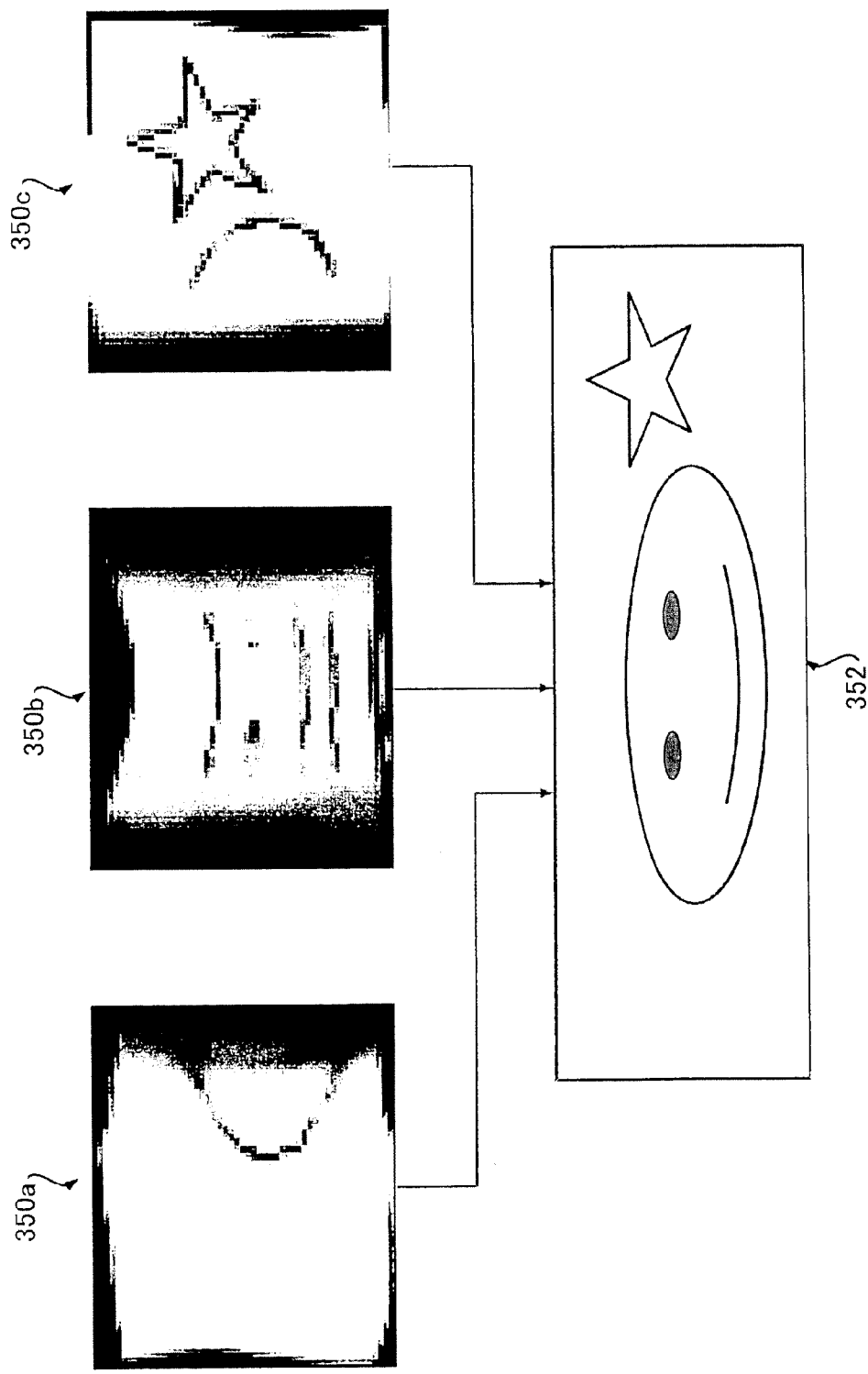

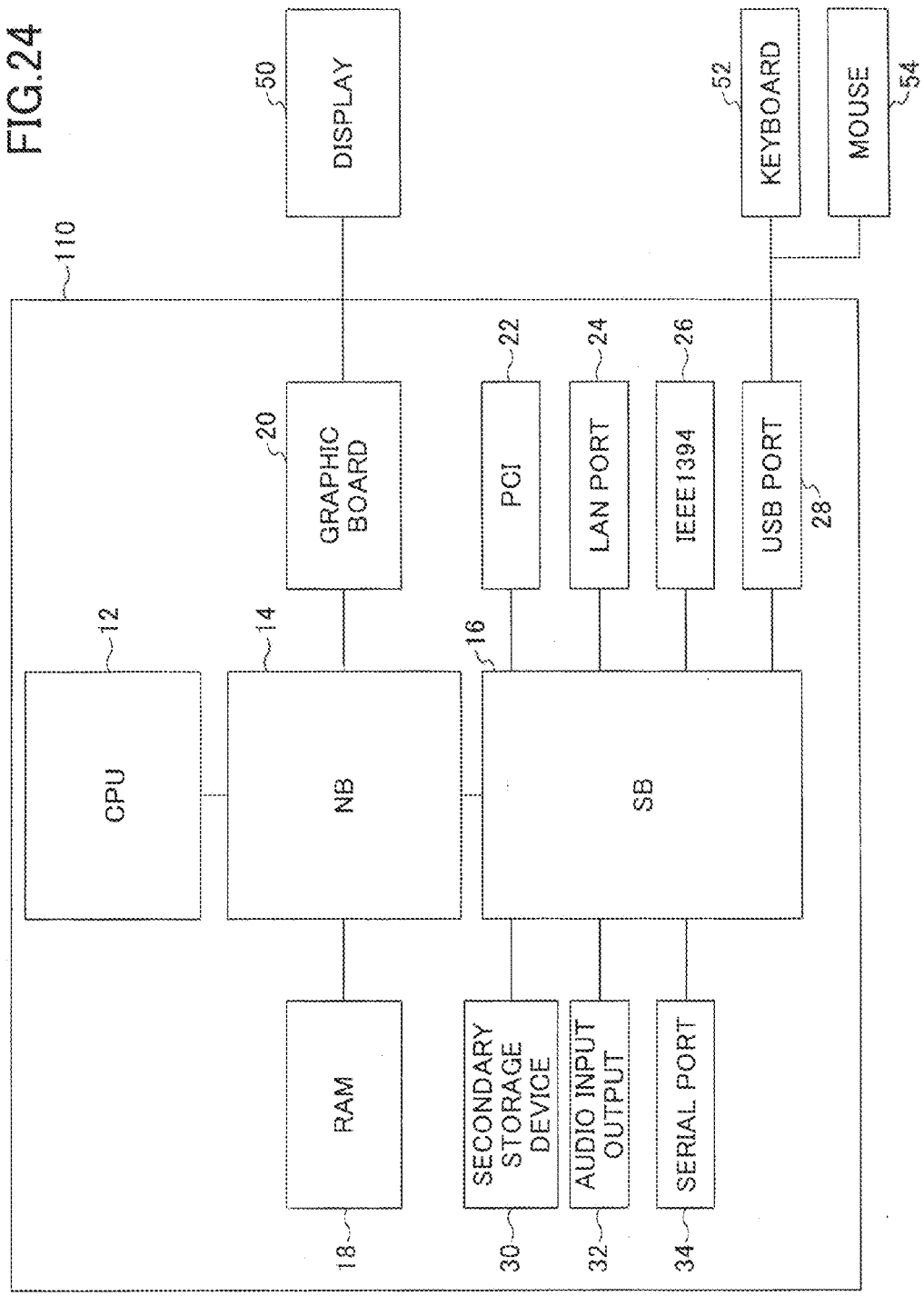

PROJECTION SYSTEM, DEVICE AND METHOD FOR THE OUTPUT OF CALIBRATION PROJECTION SCENES

BACKGROUND OF THE INVENTION

1. Field of the Invention

The present invention relates to a projection system, an image processing device, and a projection method. More specifically, the present invention relates to a projection system for projecting an image on a projection body by a plurality of projection units, an image processing device constituting the projection system, and a projection method executed by the projection system.

2. Description of the Related Art

Conventionally, the multi-projection technology is garnering attention, in which projected images from a plurality of projectors are arranged with areas overlapping with each other, and a single high-resolution image is projected on a screen.

A known example of the above multi-projection technology is described in Japanese Patent No. 3908255 (Patent Document 1). In the image projection system of Patent Document 1, a reference image is projected onto a screen from the respective projectors. The reference image includes four or more feature points whose coordinate positions are known in advance. The reference image is a known image such as a grating pattern in which bright spots or crosses are arranged with fixed intervals. Then, the positions of the feature points in the reference image, which is taken by (imaged by) a digital camera, are detected. Based on the detected positions of four or more feature points of each projector, the projection image of each projector is deformed, and the overlapping areas are detected and a blending process is performed. The projected images which have been deformed and which have undergone the blending process, are projected from the plurality of projectors, and arranged on the screen with areas overlapping each other, to form a single high-resolution image.

When performing the multi-projection described above, in order to align the projection images and match the scale of the projection images, it is necessary to sequentially or simultaneously project reference images from the projectors, and take images of the reference images. However, by the method of the conventional technology in which the reference images are sequentially projected from the projectors, and the images are taken a plurality of times, the camera needs to be fixed on a tripod, and the image needs to be taken such that the projection ranges of all projectors are included in the angular field. Therefore, this technology has been unsatisfactory in that equipment such as a tripod is necessary, which reduces the convenience. Furthermore, if the number of projectors increases, there have been cases where it is difficult to take an image to include the projection ranges of all projectors in the angular field at once. For example, when multi-projection is performed on the wall of a hallway, due to restrictions such as the width of the hallway, it is difficult to secure a sufficient distance for taking an image by including the projection ranges of all projectors in the angular field.

Meanwhile, by a method of the conventional technology of simultaneously projecting reference images from projectors and taking an image of the reference images, the structure patterns of bright spots and crosses in the reference images from projectors that are simultaneously projected, overlap each other, and the attribution of the patterns need to be determined in image processing. In this case, when the patterns of the different projectors adhere to each other, it is difficult to separate the patterns and determine the attribution of the patterns. Therefore, the conventional technology has been unsatisfactory.

Furthermore, Japanese Patent No. 3497805 (Patent Document 2) discloses a technology of performing split imaging, by which the image is taken without including the projection ranges of all projectors in the angular field described above. However, in order to combine the images taken by split imaging described in Patent Document 2, it is necessary to accurately control the position and the orientation of the camera when performing split imaging, and an exclusive-use position control device is required for this camera control. Therefore, the conventional technology of split imaging described in Patent Document 2 has been unsatisfactory in terms of the ease in calibration and cost. Furthermore, the problem of the structure patterns overlapping each other is not addressed in Patent Document 2.

Japanese Laid-Open Patent Publication No. 2012-47849 (Patent Document 3) is known as a technology of stack projection, in which when a plurality of projectors project images on a projection body to overlap each other, the structure patterns are simultaneously projected in an overlapping manner, an image is taken of the structure patterns, and the structure patterns are later separated. The conventional technology of Patent Document 3 discloses a method in which patterns whose wavelength regions of R, G, B have been changed for each projector are projected, and patterns whose polarization properties have been changed are projected, and the superposed patterns are separated later based on the wavelengths and the polarization properties. However, by the method of projecting patterns whose wavelength regions have been changed, the wavelength regions of R, G, B, of a projector and the wavelength regions of R, G, B, of a camera usually do not match, and therefore it has not been easy to separate the patterns into separate color signals by using a typical camera. By the method of projecting patterns whose polarization properties have been changed, an exclusive-use imaging device is necessary, which leads to increased cost.

Furthermore, Japanese Laid-Open Patent Publication No. 2011-182076 (Patent Document 4) discloses a method of simultaneously projecting, with a plurality of projectors, a plurality of types of patterns whose phases are shifted from each other, by devising a way to position the patterns so as not to overlap each other, and taking an image of the projected patterns. However, in order to ensure precision in pattern extraction, it is necessary to project patterns having a sufficient size. Meanwhile, it is necessary to reduce the pattern intervals in order to increase the spatial density of patterns for the purpose of increasing the precision in alignment. Furthermore, in an ultra-short focus projector that has recently become available, images are projected from a close distance to the screen, and therefore the projected image will easily become distorted in a non-linear manner, due to factors relevant to focusing or slight setting conditions, or slight irregularities on the screen. For these reasons, there has been a limit in the method of simultaneously projecting patterns with a plurality of projectors while avoiding the overlapping of the patterns, and taking an image of the projected patterns.

Patent Document 1: Japanese Patent No. 3908255
Patent Document 2: Japanese Patent No. 3497805
Patent Document 3: Japanese Laid-Open Patent Publication No. 2012-47849
Patent Document 4: Japanese Laid-Open Patent Publication No. 2011-182076

SUMMARY OF THE INVENTION

The present invention provides a projection system, an image processing device, and a projection method, in which one or more of the above-described disadvantages are eliminated.

According to an aspect of the present invention, there is provided a projection system including a plurality of projection units configured to project an image on a projection body; a taken image preparation unit configured to prepare a plurality of calibration-use images; an extraction unit configured to extract, from each of the plurality of calibration-use images, at least grating points indicating a distortion in a projected image of one of the plurality of projection units and alignment points of the projected image of the one of the plurality of projection units or a projected image of another one of the plurality of projection units; a conversion unit configured to convert, onto a common coordinate system, the grating points of the projected images of the plurality of projection units extracted from the plurality of calibration-use images by the extraction unit, based on alignment points common to the plurality of calibration-use images; and a geometric correction coefficient calculation unit configured to calculate a geometric correction coefficient for providing a projection image to be projected from the plurality of projection units, based on the grating points on the common coordinate system.

According to an aspect of the present invention, there is provided an image processing device for performing projection with the use of plurality of projection units, the image processing device including a taken image preparation unit configured to prepare a plurality of calibration-use images; an extraction unit configured to extract, from each of the plurality of calibration-use images, at least grating points indicating a distortion in a projected image of one of the plurality of projection units and alignment points of the projected image of the one of the plurality of projection units or a projected image of another one of the plurality of projection units; a conversion unit configured to convert, onto a common coordinate system, the grating points of the projected images of the plurality of projection units extracted from the plurality of calibration-use images by the extraction unit, based on alignment points common to the plurality of calibration-use images; and a geometric correction coefficient calculation unit configured to calculate a geometric correction coefficient for providing a projection image to be projected from the plurality of projection units, based on the grating points on the common coordinate system.

According to an aspect of the present invention, there is provided a projection method of projecting an image on a projection body by a plurality of projection units, the projection method including preparing, by a computer, a plurality of calibration-use images; extracting, by the computer, from each of the plurality of calibration-use images, at least grating points indicating a distortion in a projected image of one of the plurality of projection units and alignment points of the projected image of the one of the plurality of projection units or a projected image of another one of the plurality of projection units; converting, by the computer, onto a common coordinate system, the grating points of the projected images of the plurality of projection units extracted from the plurality of calibration-use images at the extracting, based on alignment points common to the plurality of calibration-use images; and calculating, by the computer, a geometric correction coefficient for providing a projection image to be projected from the plurality of projection units, based on the grating points on the common coordinate system converted at the converting.

BRIEF DESCRIPTION OF THE DRAWINGS

Other objects, features and advantages of the present invention will become more apparent from the following detailed description when read in conjunction with the accompanying drawings, in which:

FIG. 17A illustrates a data structure of a geometric correction coefficient;

FIG. 17B illustrates a data structure of a blending coefficient;

FIG. 18 describes a correction process based on a correction coefficient, executed by a correction processing unit according to the embodiment;

FIG. 24 illustrates a hardware configuration of a general-purpose computer according to the embodiment.

DETAILED DESCRIPTION OF THE PREFERRED EMBODIMENTS

A description is given, with reference to the accompanying drawings; however, the present invention is not limited to the embodiments described below. Note that in the embodiments described below, an example of a projection system is described by a projection system 100 including a plurality of projectors which are projection units, a single camera which is an imaging unit, and an image processing device which performs overall control.

Overall Configuration

Figure 1:
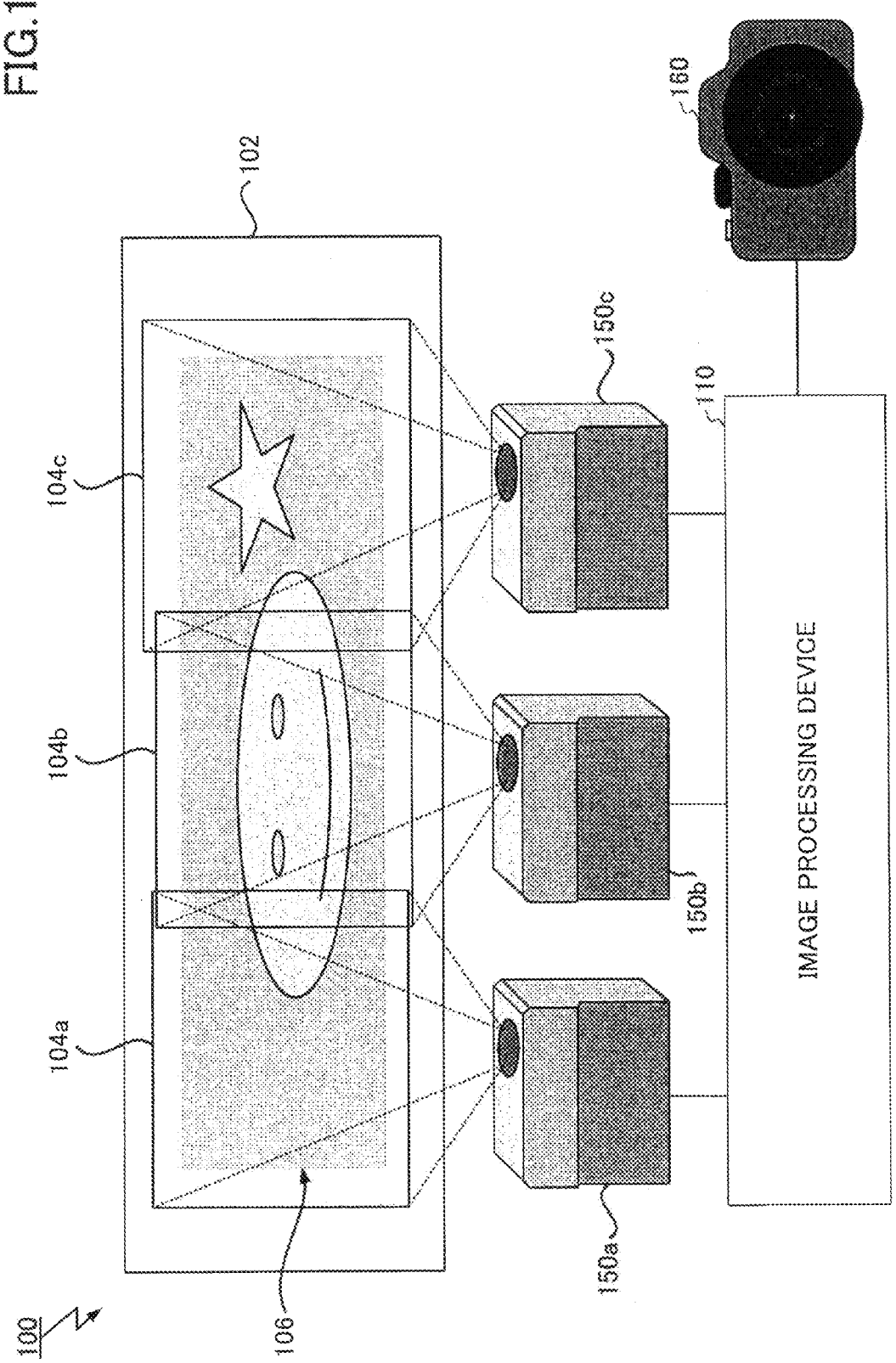
FIG. 1 is a schematic diagram illustrating the overall configuration of a projection system according to an embodiment.

FIG. 1 is a schematic diagram illustrating the overall configuration of the projection system 100 according to the present embodiment. The projection system 100 illustrated in FIG. 1 includes an image processing device 110 for performing the overall control of the system, a plurality of projectors 150, and a camera 160. Note that in the embodiment described below, the projection system 100 has a configuration corresponding to so called large-sized screen multi-projection, in which the projected images of three projectors 150a through 150c are combined on the projection surface, and the combined image is projected in an area that is larger than the case of using a single projector.

The image processing device 110 is typically a general-purpose computer such as a personal as a work station. Note that the image processing device 110 is not limited to a general-purpose computer; the image processing device 110 may be implemented as an exclusive-use computer, or may be incorporated in one of the projectors 150.

Each of the projectors 150 is a projection device that uses, for example, a liquid crystal method, a CRT (Cathode Ray Tube) method, a DLP (Digital Light Processing) method, or a LCOS (Liquid Crystal On Silicon) method.

The camera 160 is an imaging device including an imaging sensor such as a CMOS (Complementary Metal Oxide Semiconductor) or a CCD (Charge Coupled Device), and an imaging optical system such as a lens for imaging an image on a light receiving area of the image sensor. The camera 160 may be an exclusive-use device such as a web camera, a digital still camera, and a digital video camera, or a device incorporated in a general-purpose device such as a smartphone terminal and a tablet terminal.

In the projection system 100, a screen 102 is set for providing a projection surface. The projectors 150 are arranged for projecting images on the screen 102, such that the positions of projection centers of the projectors 150 are shifted from each other. The image processing device 110 generates a plurality of projection images to be projected by the plurality of projectors 150a through 150c, and outputs the respective projection images to the corresponding projectors 150. The projectors 150 project, on the screen 102 that is a projection body, the projection images input to the respective projectors 150 from the image processing device 110. As illustrated in FIG. 1, on the screen 102, a plurality of projected images 104a through 104c are projected from the plurality of projectors 150a through 150c, respectively. The plurality of projected images 104a through 104c from the plurality of projectors 150a through 150c are superposed on the projection surface, and combined into a single projected image 106.

During a projection mode, the projection system 100 uses the plurality of projectors 150a through 150c to project a single projected image 106 as described above; however, before the projection mode, a calibration process is usually performed. The camera 160 illustrated in FIG. 1 is used for this calibration process. During the calibration mode, the image processing device 110 outputs calibration images to the plurality of projectors 150, and causes the projectors 150 to project a calibration-use projected image (projected image used for calibration) on the screen 102. Then, the viewpoint and the vision of the camera 106 are set, such that projected images 104 projected by the predetermined projectors 150 fit inside the angular field of the camera 160. The camera 160 takes images (performs imaging) of the calibration-use projected images for a plural number of times in order to perform calibration.

The taken image taken by the camera 160 (hereinafter, a taken image in which a calibration-use projected image is included, is referred to as a "calibration-use image") is sent to the image processing device 110 by wireless connection such as wireless LAN (Local Area Network), Bluetooth (registered trademark), wireless USB (Universal Serial Bus), or wired connection such as wired USB and wired LAN. Alternatively, the calibration-use image taken by the camera 160 is scanned by the image processing device 110 via a removable medium such as a SD card (registered trademark) or compact flash (registered trademark).

The image processing device 110 uses the plurality of input calibration-use images to calculate various correction coefficients for aligning the positions, matching the scale, correcting the distortion, and adjusting the brightness of the overlapping areas, with respect to the projected images of the plurality of projectors 150a through 150c. During the projection mode, the image processing device 110 generates a projection image that has been corrected in order to be projected by the projectors 150a through 150c, based on the respective correction coefficients that have been calculated. In the following, with reference to FIGS. 2 through 5, a description is given of an overview of a calculation process of calculating the respective correction coefficients and a correction process based on the correction coefficients.

Overall Functional Configuration

Figure 2:
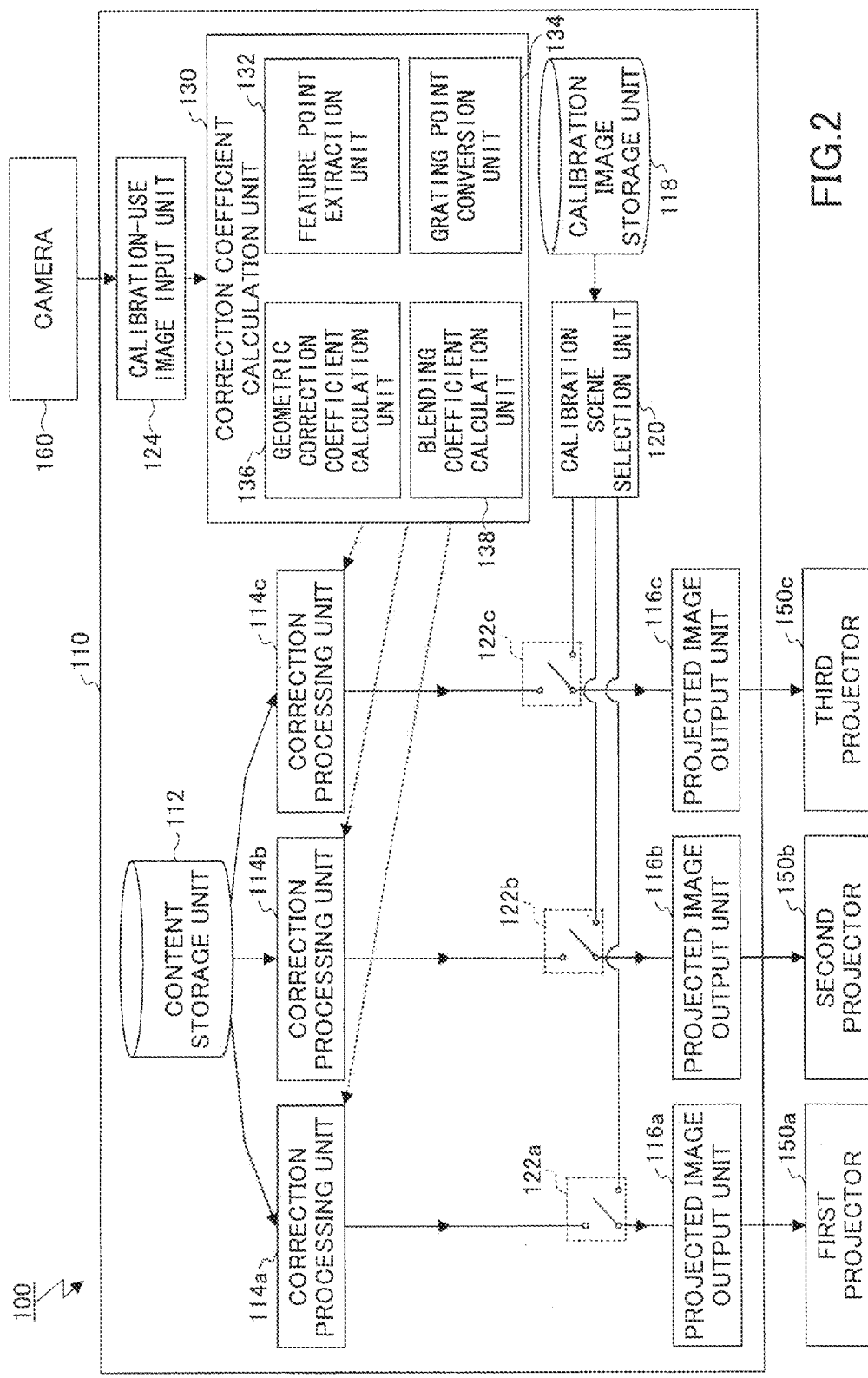
FIG. 2 is a functional block diagram of the projection system according to an embodiment.

FIG. 2 is a functional block diagram of the projection system 100 according to the present embodiment. The projection system 100 illustrated in FIG. 2 includes a plurality of functional blocks that operate on the image processing device 110. The image processing device 110 includes a content storage unit 112, correction processing units 114a through 114c of the respective projectors, projected image output units 116a through 116c of the respective projectors, and switching units 122a through 122c of the respective projectors. The image processing device 110 further includes a calibration image storage unit 118, a calibration scene selection unit 120, a calibration-use image input unit 124, and a correction coefficient calculation unit 130.

The content storage unit 112 stores a file of a content image that is the target to be projected as the single projected image 106. The content storage unit 112 is used as a storage area of a HDD (Hard Disk Drive), a SSD (Solid State Drive), and a detachably attached removable medium. Note that the content image that is the projection target may be given as a display screen when a word processor or an application of a presentation executes a file, or may be given as a still image, or may be given as a frame of an arbitrary timing in a video file. Furthermore, the content image need not be given as file; the content image may be given as a screen generated as the image processing device 110 executes the operating system, or as a projected image input to the image processing device 110 from outside. In the following, as a matter of convenience, a description is given of an example where the content image is given as a still image.

The correction processing units 114a through 114c are provided to correspond to the projectors 150a through 150c included in the projection system 100, respectively. Each of the correction processing units 114 reads a content image from the content storage unit 112, performs a correction process on the content image, and generates a projection image for the corresponding projector. Note that details of the processes executed by the correction processing units 114a through 114c are described below.

The projected image output units 116a through 116c are provided to corresponding to the projectors 150a through 150c included in the projection system 100, respectively. Each of the projected image output units 116 includes a display output connected to the corresponding projector 150, and outputs, to the connected projector 150, a projected image of the input image selected at the switching unit 122.

The switching units 122a through 122c switch the flow of the image according to the operation mode of the projection system 100. During the projection mode of projecting the content image, the switching unit 122 switches the input side to the output of the correction processing unit 114. In accordance with this switching operation, during the projection mode, the projected image output unit 116 outputs a projected image of the processing result based on the content image according to the corresponding correction processing unit 114. Meanwhile, during the calibration mode, the switching unit 122 switches the input side to the output of the calibration scene selection unit 120 described below. In accordance with this switching operation, during the calibration mode, each of the projected image output units 116 outputs a projected image of the calibration image selected and output by the calibration scene selection unit 120.

The calibration image storage unit 118 stores a calibration image to be projected from the projector 150 during the calibration mode. The calibration image storage unit 118 is used as a storage area of a HDD, a SSD, and a detachably attached removable medium. The calibration image is typically provided as a still image that is prepared in advance.

Figure 3A:
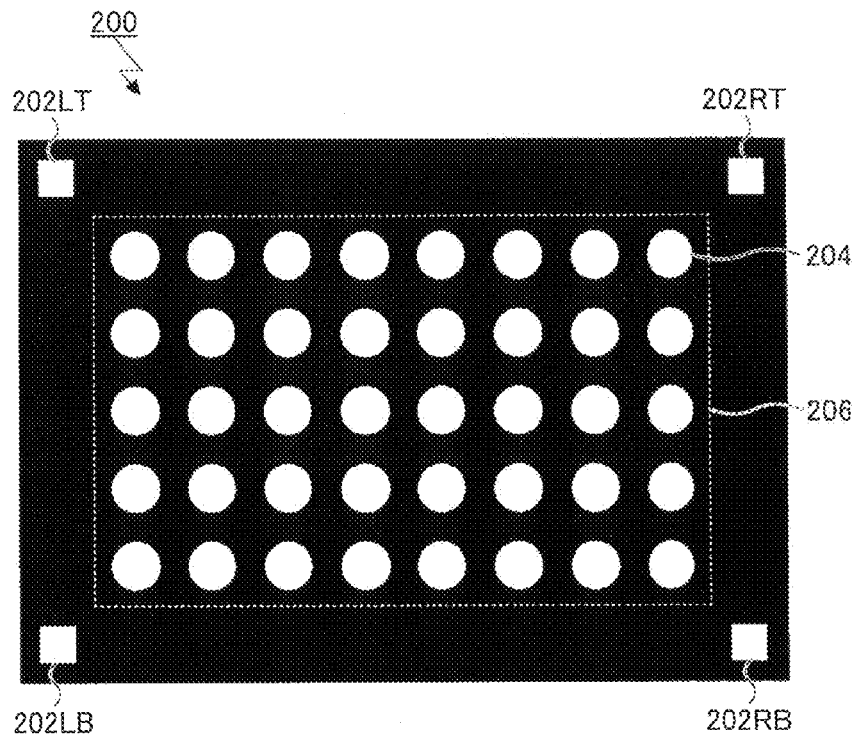
FIGS. 3A and 3B illustrate examples of two types of calibration images used in the projection system according to the embodiment.
Figure 3B:
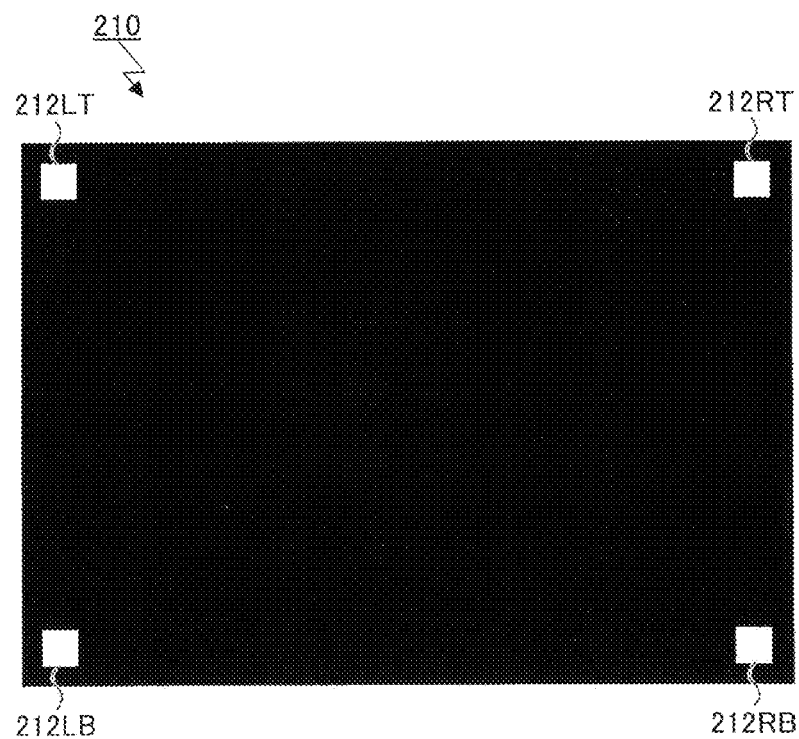

The calibration image may include both of or one of a grating pattern that defines the grating points (points on the coordinate system of each of the calibration-use images including a grating pattern) in the projected image, or an aligning pattern that defines the alignment points in the projected image. FIGS. 3A and 3B illustrate examples of two types of calibration images used in the projection system 100 according to the present embodiment. FIG. 3A illustrates an example of a first calibration image 200 including both an alignment pattern 202 and a grating pattern 206. FIG. 3A illustrates an example of a second calibration image 210 including only an alignment pattern 212.

The grating pattern 206 is for defining coordinates in the projector memory, and includes patterns in which arbitrary figure elements are arranged by a predetermined rule. By taking an image of the grating pattern 206 projected on the screen 102, it is possible to detect trapezoidal distortions and local distortions in the projected image. In the first calibration image 200 illustrated in FIG. 3A, the grating pattern 206 divides the entire projection area of the projector 150 into ten blocks in the horizontal direction and in seven blocks in the vertical direction, and in the center 8×5 blocks among these blocks, solid white circles 204 are arranged in a grating pattern on a black background.

However, the grating pattern 206 is not particularly limited; various kinds of patterns may be used, such as polka-dots in which circles having a contrast with respect to the background as illustrated in FIG. 3A are arranged two-dimensionally, a dot pattern in which dots having a contrast with respect to the background are arranged two-dimensionally, a checkered pattern in which squares of two colors having a contrast with each other are alternately arranged in the horizontal and vertical directions, and a grating pattern in which lines having a contrast with respect to the background are arranged two dimensionally. The method of dividing the entire projection area of the projector 150 is not limited to the above embodiment; the number by which the area is divided and the division method of the area may be determined according to the required precision and the performance of the image processing device 110.

The alignment patterns 202, 212 are for defining the reference positions (alignment points) of the projected images among the taken images, and are patterns in which a plurality of arbitrary figure elements are arranged at predetermined positions. By taking a plurality of images including the common alignment patterns 202, 212 projected on the screen 102, it is possible to perform alignment among the plurality of taken images.

In the first calibration image 200 including both the alignment pattern and the grating pattern, preferably, as illustrated in FIG. 3A, the alignment pattern 202 is arranged at a position around the area where the grating pattern 206 is arranged, as illustrated in FIG. 3A. Also in the second calibration image 210 including only the alignment pattern, as illustrated in FIG. 3B, the alignment pattern 212 is arranged at the same position as the calibration image of FIG. 3A (position around area of grating pattern if grating pattern is included).

In the first calibration image 200 illustrated in FIG. 3A, in the alignment pattern 202, rectangular markers 202LT, 202RT, 202LB, and 202RB are arranged at the four corners of the outer periphery of the 10×7 blocks in the enter projection image area of the projector 150. Also in the second calibration image 210 of FIG. 3B, in the alignment pattern 212, rectangular markers 212LT, 212RT, 212LB, and 212RB are arranged at the four corners of the outer periphery of the 10×7 blocks.

However, the alignment patterns 202, 212 are not particularly limited. The shapes of the markers in the alignment patterns 202, 212 may be an arbitrary figure element such as a circle, and the number of markers may be any number as long as there are at least four points. Note that by increasing the number of markers used for alignment, the alignment precision can be improved.

Referring back to FIG. 2, in the calibration process according to the present embodiment, images are taken over a plurality of times, of the grating pattern for detecting geometric distortions in the projected image of the projector 150, and the results of the plurality of taken images are combined by the alignment pattern. The calibration scene selection unit 120 reads the respective calibration images from the calibration image storage unit 118, selects appropriate calibration images, and outputs the selected calibration to the plurality of projectors 150a through 150c. Here, the calibration scene selection unit 120 has recognized the positional relationships between the projected images of the plurality of projectors 150, and the calibration image is selected according to the respective stages of the calibration process, such that sufficient calibration results of the projectors 150 can be obtained overall. A scene of each stage of the calibration process including a calibration image to be projected by at least one of the projectors 150, is referred to as a calibration projection scene.

According to the calibration scene selection unit 120, the respective projectors 150 are caused to project calibration images according to the calibration projection scene. At this time, the user uses the camera 160 to take an image of each calibration projection scene, such that the projected calibration-use projected images fit in the angular field. The calibration-use image input unit 124 receives input of the taken images from the camera 160 via wireless connection, wired, connection, or a removable medium, and prepares a plurality of calibration-use images for the calibration process. Note that at least in one calibration projection scene, the user is required to take an image by directly facing the screen. Typically, a water level is used to take a first image by directly facing the screen. In this case, when taking the second image and onward, there is no need for the user to directly face the screen. The calibration-use image taken by directly facing the screen 102 is used as a reference for combining the results.

Figure 4:
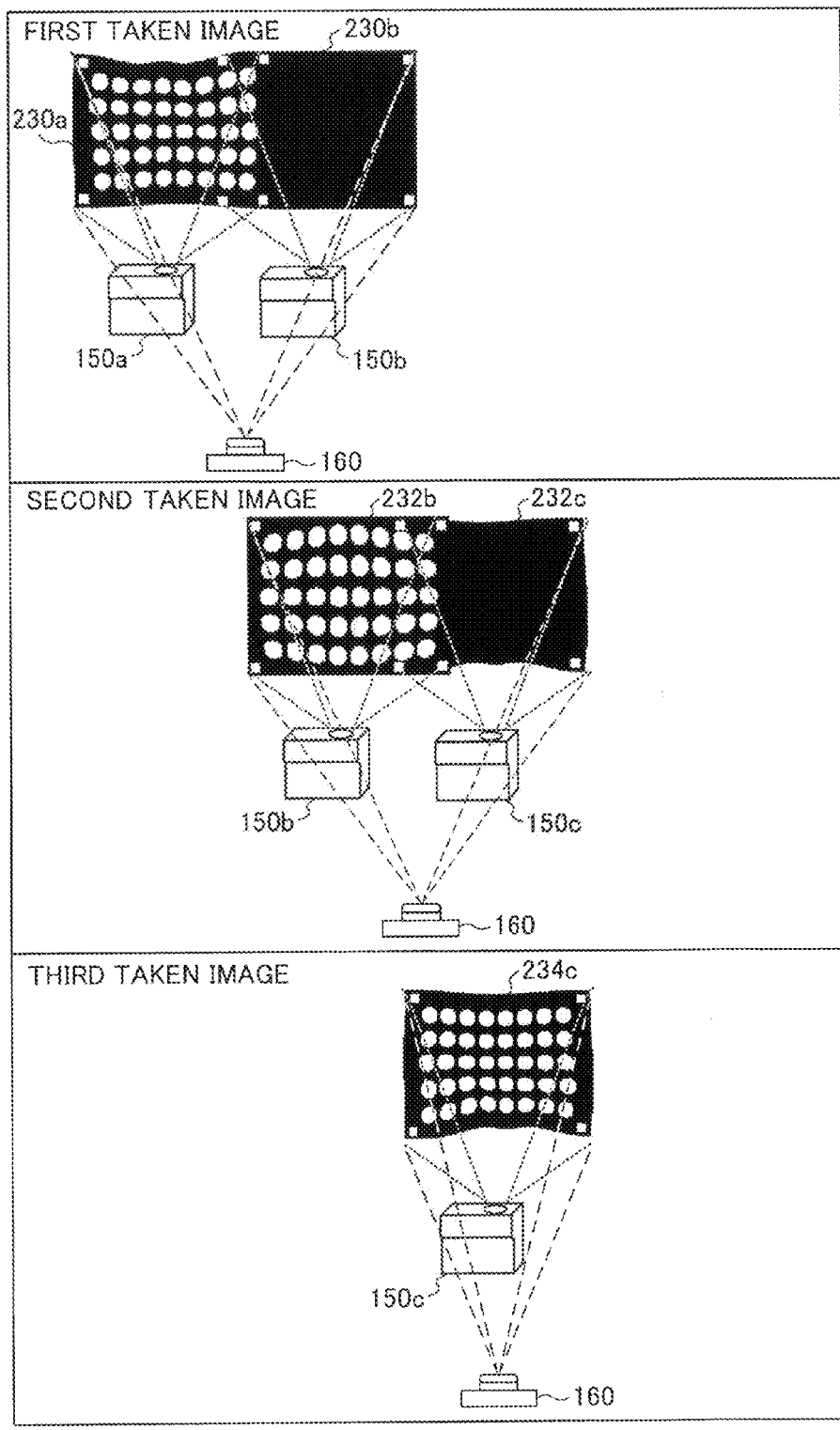
FIG. 4 is for describing how a calibration scene selection unit sequentially selects calibration projection scenes, and a method of taking the calibration projection scenes, in a first mode.
Figure 5:
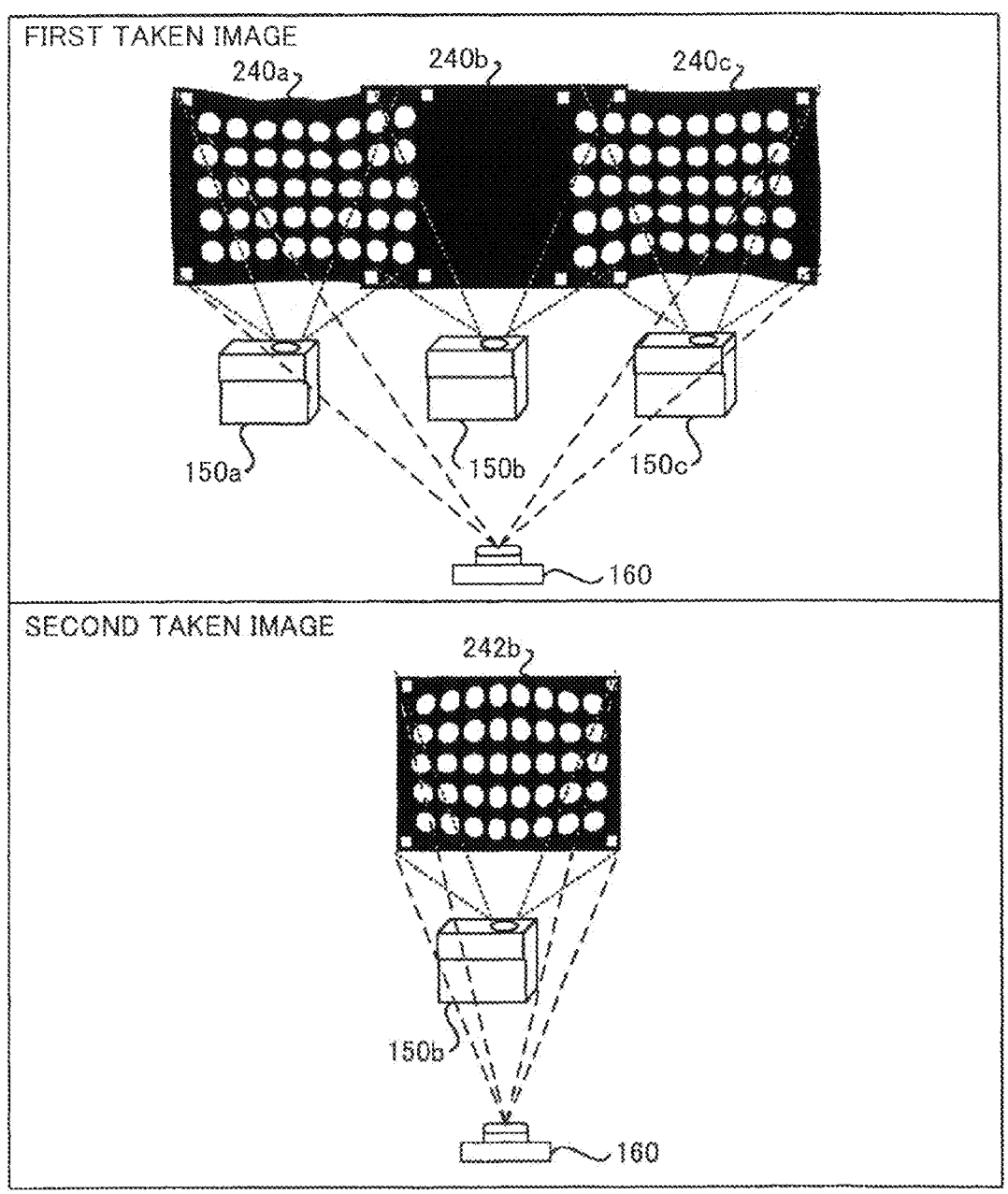
FIG. 5 is for describing how the calibration scene selection unit sequentially selects calibration projection scenes, and the method of taking the calibration projection scenes, in a second mode.

In the present embodiment where three projectors 150a through 150c are used as illustrated in FIG. 1, it is possible to take a calibration-use image by forming calibration projection scenes of two modes as illustrated in FIGS. 4 and 5. FIG. 4 is for describing how the calibration scene selection unit 120 sequentially selects the calibration projection scenes, and the method of taking the calibration projection scenes, in the first mode. FIG. 5 is for describing how the calibration scene selection unit 120 sequentially selects the calibration projection scenes, and the method of taking the calibration projection scenes, in the second mode.

In the first mode, as illustrated in FIG. 4 three calibration projection scenes are prepared, corresponding to images taken three times. In the first calibration projection scene, the first projector 150a projects the first calibration image 200 illustrated in FIG. 3A, and the second projector 150b projects the second calibration image 210 illustrated in FIG. 3B. The third projector 150c does not project anything. In the first calibration projection scene, the camera 160 is used to take images such that projected images 230a, 230b of the first and second projectors 150a, 150b fit in the vision.

In the second calibration projection scene, the first projector 150a does not project anything, the second projector 150b projects the first calibration image 200 illustrated in FIG. 3A, and the third projector 150c projects the second calibration image 210 illustrated in FIG. 3B. In the second calibration projection scene, the camera 160 is used to take images such that projected images 232b, 232c of the second and third projectors 150b, 150c fit in the vision. In the last third calibration projection scene, the third projector 150c projects the first calibration image 200 illustrated in FIG. 3A. The first and second projectors 150a, 150b do not project anything. In the third calibration projection scene, an image is taken such that the projected image 234c of the third projector 150c fits in the vision.

Note that in FIG. 4, three calibration projection scenes are prepared corresponding to the three projectors 150a through 150c for arranging three projected images in the horizontal direction. However, by generalizing with respect to a N (N≥2) number of projectors 150, an N number of calibration projection scenes are to be constituted as follows. That is to say, the n (1≤n≤N−1)th calibration projection scene is prepared, such that one of the projectors arranged adjacent to each other (nth projector) projects a calibration image including an alignment pattern as illustrated in FIG. 3A (the first projector does not necessarily need to project an alignment pattern) and at least a grating pattern, and the other one of the adjacent projectors (n+1th projector) projects a calibration image including only an alignment pattern as illustrated in FIG. 3B. The last Nth calibration projection scene is prepared such that the last projector (Nth projector) projects a calibration image including both a grating pattern and an alignment pattern as illustrated in FIG. 3A. In the two calibration-use images, the results are combined by using the alignment pattern projected by a common projector 150.

In the first mode described above, the range that is fit in one image taken by the camera 160 is a projection range corresponding to two projectors at maximum. Thus, even if the number of projectors N increases, the restriction (of the position of the camera 160) in the depth direction with respect to the screen 102 is alleviated, and therefore the screen may be arranged in various ways. Note that the same is applicable even if the projected images are arranged in a vertical direction, or if the projected images are arranged two-dimensionally in a unicursal manner.

In the second mode, as illustrated in FIG. 5, two calibration projection scenes are prepared, corresponding to two taken images. In the first calibration projection scene, the first projector 150a and the third projector 150c project the first calibration image 200 illustrated in FIG. 3A, and the second projector 150b projects the second calibration image 210 illustrated in FIG. 3B which only includes the alignment pattern. In the second calibration projection scene, the second projector 150b projects the first calibration image 200 illustrated in FIG. 3A. The first and third projectors 150a, 150c do not project anything. In the first calibration projection scene, an image is taken by the camera 160 such that the projected images 240a through 240c of the projectors 150a through 150c fit in the vision of the camera 160. In the second calibration projection scene, an image is taken by the camera 160 such that a projected image 242b of the second projector 150b fits in the vision of the camera 160.

Note that in FIG. 5, two calibration projection scenes are prepared, corresponding to the three projectors 150a through 150c for arranging three projected images in the horizontal direction. By generalizing with respect to an N(N≥3) number of projectors 150, the two calibration projection scenes are to be constituted as follows. That is to say, in the first calibration projection scene, in the arrangement of projected images, a first group of projectors (for example, the projectors in the odd number order) alternately selected from the plurality of projectors 150 are constituted to project a first calibration image including at least a grating pattern. In the second calibration projection scene, in the arrangement of projected images, a second group of projectors (for example, the projectors in the even number order) respectively arranged adjacent to the projectors of the first group are constituted to project grating patterns. Furthermore, the first calibration projection scene and the second calibration projection scene are constituted such that at least one common projector projects an alignment pattern.

More preferably, in the first calibration projection scene, the projectors of the second group (for example, the projectors in the even number order) are constituted to project second calibration images including only the alignment pattern. In the second calibration projection scene, the projectors of the second group are constituted to project first calibration images including both a grating pattern and an alignment pattern.

In the second mode described above, although the range that is fit in one image taken by the camera 160 is large, only two images need to be taken. Therefore, when the problem in the restriction (of the position of the camera 160) in the depth direction with respect to the screen 102 can be avoided, the calibration operation can be simplified. Note that the same applies to the case of arranging the projected images in the vertical direction. Furthermore, in the above description, an image of the entire area is taken one time by each of the first group and the second group. However, in another embodiment, in order to reduce the necessary angular field, in both the first and second groups, the area may be divided and images may be taken over a plurality of times, and the images may be combined according to an alignment pattern that is common in the group.

Referring back to FIG. 2, the correction coefficient calculation unit 130 reads a plurality of calibration-use images prepared by the calibration-use image input unit 124, and calculates various correction coefficients to be set in the correction processing units 114a through 114c. It is assumed that the respective calibration-use images and the calibration scenes are given, in association with each other, to the calibration-use image input unit 124. More specifically, the correction coefficient calculation unit 130 includes a feature point extraction unit 132, a grating point conversion unit 134, a geometric correction coefficient calculation unit 136 for calculating a geometric correction coefficient, and a blending coefficient calculation unit 138 for calculating a blending correction coefficient.

The feature point extraction unit 132 extracts feature points from each of the plurality of calibration-use images that have been prepared. The feature points that are extracted may include grating points indicating the distortion of the projected image corresponding to the grating point pattern of the calibration image, and alignment points that are used as references of alignment between the calibration-use images corresponding to the alignment pattern of the calibration image.

The grating points of the each of the projectors and the alignment points of the taken images extracted by the feature point extraction unit 132, are passed to the grating point conversion unit 134. The grating point conversion unit 134 converts, onto a common coordinate system, the grating points of the projection images of the projectors 150 extracted from the plurality of calibration-use images by the feature point extraction unit 132 (at this stage, the grating points are points on the coordinate system of each of the calibration-use images), and combines these grating points, based on common alignment points among the calibration-use images. In the described embodiment, the common coordinate system is a coordinate system of the first calibration-use image taken by directly facing the screen 102.

The grating points of the respective projectors converted onto the common coordinate system by the grating point conversion unit 134, are passed to the geometric correction coefficient calculation unit 136. The geometric correction coefficient calculation unit 136 calculates, based on the grating points on the common coordinate system, the geometric correction coefficients of the respective projectors to which projection images to be projected from the plurality of projectors 150 are given. The geometric correction coefficient is a correction coefficient in which geometric corrections are incorporated, such as alignment, scale matching, and distortion correction.

The blending coefficient calculation unit 138 detects an overlapping area with respect to each of the plurality of projectors 150. The overlapping area is the area where a projected image of a target projector (for example, 150a) and a projected image of each projector (for example, 150b) adjacent to the target projector, overlap each other. The blending coefficient calculation unit 138 calculates the blending coefficient for adjusting the overlapping of these projected images, based on the detection result of the overlapping area. According to the blending coefficients of each of the projectors, the images are smoothly combined at parts where the projected images of the plurality of projectors 150 overlap each other on the screen 102.

Each of the correction processing units 114 generates a projection image for each projector from the content image, based on various correction coefficients calculated by the geometric correction coefficient calculation unit 136 and the blending coefficient calculation unit 138. More specifically, the correction processing unit 114 first generates an intermediate image for each projector from the content image, based on the geometric correction coefficient calculated by the geometric correction coefficient calculation unit 136. The intermediate image is formed by deforming the image handled by the projector of the content image, in an inverse manner with respect to the detected geometric distortion. Next, the correction processing unit 114 multiplies the intermediate image by the blending coefficient calculated by the blending coefficient calculation unit 138, and calculates the final projection image for each projector. During the projection mode, the switching unit 122 selects the projection image calculated by the correction processing unit 114, and the selected projection image is output to the projector 150.

Note that in the embodiment illustrated in FIG. 2, the respective functional units 112 through 138 are realized in a single image processing device 110; however, an embodiment of the projection system 100 is not limited to that of FIG. 2. In another embodiment, in order to reduce the load of the image processing apparatus caused by an increase in the number of projectors, the correction processing units 114a through 114c may be realized in the projectors 150a through 150c, respectively. In another embodiment, the respective functional units 112 through 138 may be implemented by being distributed across a plurality of image processing devices, or all of the functional units 112 through 138 may be implemented in one of the projectors 150, or the functions may be implemented as a single device including the functions of the image processing device 110 and the functions of the plurality of projectors. Furthermore, in another embodiment, the functions of the correction coefficient calculation unit 130 may be implemented as a server providing services via a network.

Overall Process Flow

Figure 6:
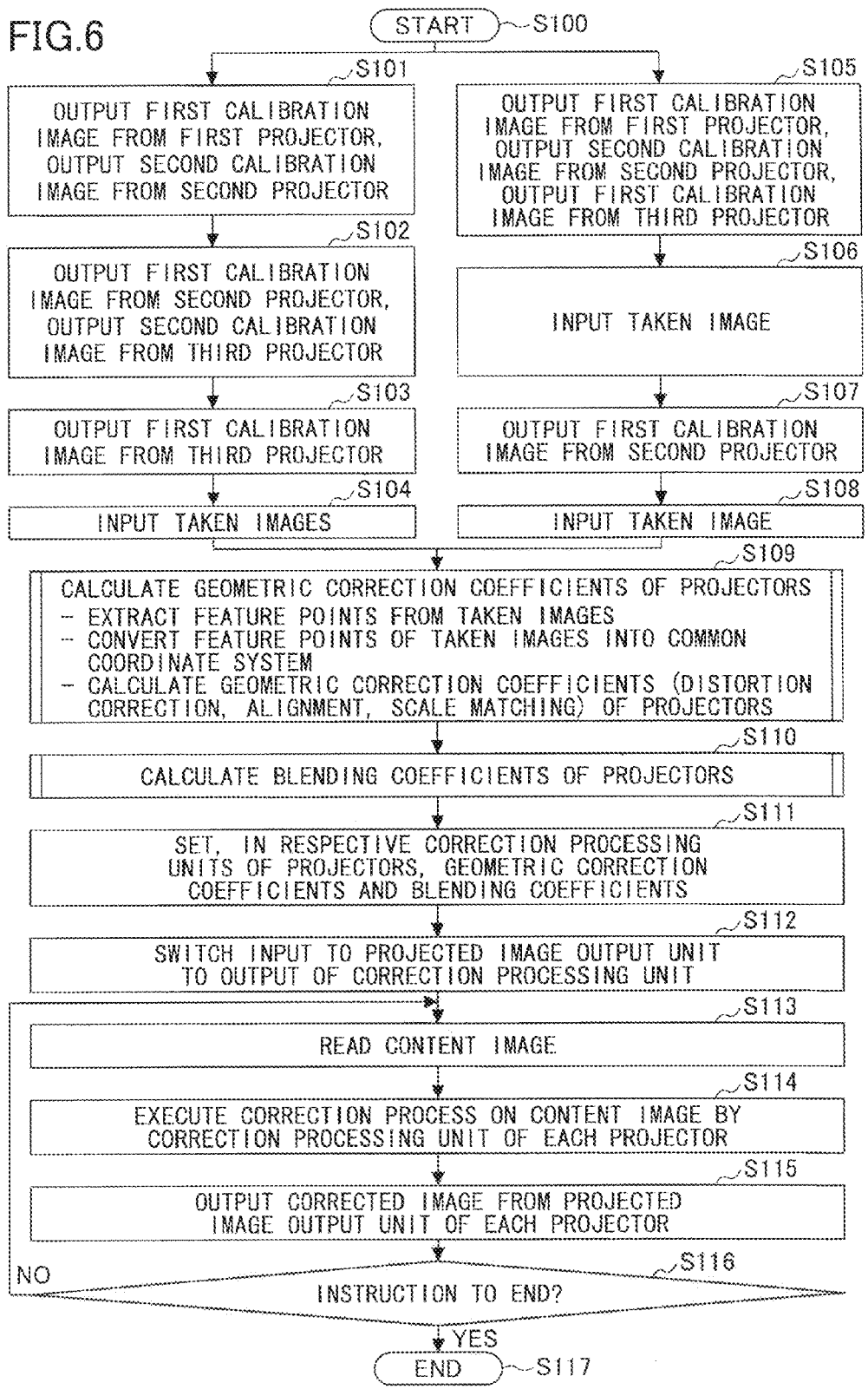
FIG. 6 is a flowchart indicating the overall flow of the calculation process of calculating various correction coefficients, and a correction process based on the correction coefficients, according to the embodiment.

In the following, with reference to FIG. 6, a description is given of the overall flow of the calculation process of calculating various correction coefficients, and the correction process based on the correction coefficients. FIG. 6 is a flowchart indicating the overall flow of the calculation process of calculating various correction coefficients, and the correction process based on the correction coefficients. The process of FIG. 6 is started from step S100 in response to an instruction from the user to start a calibration process. Note that in FIG. 6, the first mode indicated by steps S101 through S104 and the second mode indicated by steps S105 through S108 are both collectively illustrated.

In the first mode illustrated in FIG. 4, in step S101, the image processing device 110 causes the first projector 150a to output a first calibration image (including a grating pattern), and causes the second projector 150b to output a second calibration image (including an alignment pattern). In step S102, the image processing device 110 causes the second projector 150b to output a first calibration image (including both a grating pattern and an alignment pattern), and causes the third projector 150c to output a second calibration image (including an alignment pattern). In step S103, the image processing device 110 causes the third projector 150c to output a first calibration image (including both a grating pattern and an alignment pattern). In each of steps S101 through S103, the user takes images such that the calibration images being projected fit in the angular field of the camera 106, according to the guidance given by the image processing device 110, for example. In step S104, the image processing device 110 collectively receives the input of a plurality of calibration-use images from the camera 160, and the process proceeds to step S109.

Meanwhile, in the second mode illustrated in FIG. 5, in step S105, the image processing device 110 causes the first and third projectors 150a, 150c to output a first calibration image (including a grating pattern), and causes the second projector 150b to output a second calibration image (including an alignment pattern). In step S106, the image processing device 110 receives input of the calibration-use image taken in step S105 from the camera 160. In step S107, the image processing device 110 causes the second projector 150b to output a first calibration image (including both a grating pattern and an alignment pattern). In step S108, the image processing device 110 receives the input of the calibration-use image taken in step S107 from the camera 160, and the process proceeds to step S109.

In step S109, for which details are described below, the image processing device 110 calculates the geometric correction coefficients of the respective projectors. In the geometric correction coefficient calculation process for each projector in step S109, the image processing device 110 extracts the feature points from the respective calibration-use images, converts the feature points into a common coordinate system of the grating points of the respective calibration-use images, and calculates the geometric correction coefficient of each projector. In step S110, for which details are described below, the image processing device 110 calculates the blending coefficients of the respective projectors.

In step S111, the image processing device 110 sets, in the respective correction processing units 114, the geometric correction coefficients and the blending coefficients for each of the projectors, calculated in steps S109 and S110. In step S112, the image processing device 110 causes the switching unit 122 to switch the input of the projected image output unit 116 to the output of the correction processing unit 114, and shifts to the projection mode.

In step S113, the image processing device 110 reads the content image. In step S114, the image processing device 110 executes a correction process on the content image by the correction processing unit 114 of each projector. In step S115, the image processing device 110 causes the projected image output unit 116 of each projector to output the corrected projection image of each projector.

In step S116, the image processing device 110 determines whether an instruction to end the projection mode has been received from the user. In step S116, when the image processing device 110 determines that an instruction to end the projection mode has not been received (NO), the process loops to step S113, and the projection image is updated. In the case of a video, the process proceeds to a process for the next frame. In step S116, when the image processing device 110 determines that an instruction to end the projection mode has been received (YES), the process is branched to step S117, and the process ends.

Calculation of Geometric Correction Coefficient

Figure 7:
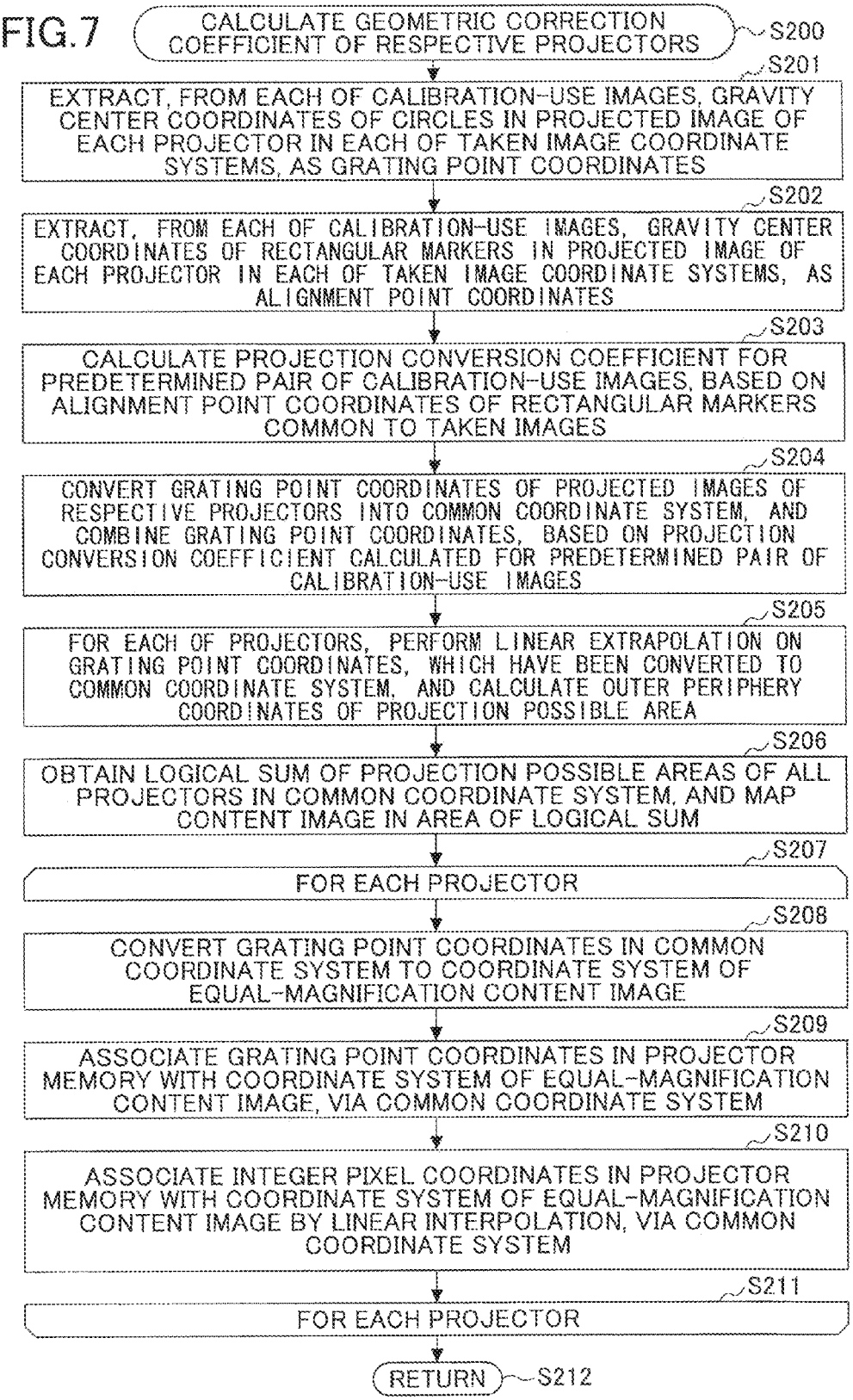
FIG. 7 is a flowchart indicating a process of calculating a geometric correction coefficient executed by a correction coefficient calculation unit according to the embodiment.

In the following, with reference to FIGS. 7 through 13 and 17A, a description is given of details of the process of calculating geometric correction coefficients of the respective projectors. FIG. 7 is a flowchart indicating a process of calculating a geometric correction coefficient executed by the correction coefficient calculation unit 130 according to the present embodiment. The process illustrated in FIG. 7 is started from step S200 when the process is called in step S109 of FIG. 6.

In step S201, the feature point extraction unit 132 extracts, from each of the plurality of calibration-use images that have been prepared, the gravity center coordinates of the circles in the projected image of each projector 150 in each of the taken image coordinate systems, as grating point coordinates (decimal point accuracy). The gravity center coordinates of the circles may be calculated by, for example, binarizing the image, cutting out a bundle of white pixels by pattern matching, and obtaining the gravity center coordinates of the bundle of white pixels.

In step S202, the feature point extraction unit 132 extracts, from each of the plurality of calibration-use images, the gravity center coordinates of the rectangular markers of the projected images of the projectors 150 in each of the taken image coordinate systems, as alignment point coordinates. Similarly, the gravity center coordinates of the rectangular markers may be calculated by, for example, binarizing the image, cutting out a bundle of white pixels by pattern matching, and obtaining the gravity center coordinates of the bundle of white pixels.

A detailed description is given of the first mode illustrated in FIG. 4. The feature point extraction unit 132 extracts, from the respective calibration-use images obtained by taking the n (1≤n≤N−1)th calibration projection scene, in the arrangement of projected images, the alignment point of the alignment pattern (not necessarily projected by first projector) and at least the grating points of the grating pattern projected by one (nth projector) of projectors arranged adjacent to each other. Furthermore, the alignment points of the alignment pattern projected by the other one of the projectors (n+1th projector). From the calibration-use image obtained by taking the last Nth calibration projection scene, the grating points of the grating pattern and the alignment points of the alignment pattern projected by the last projector (Nth) are extracted.

Note that in a single calibration-use image, the circular patterns of one of the projectors and the four alignment rectangular markers of the other projector may be identified by using the positional relationship between each other. When the calibration projection scene is constituted according to the first mode illustrated in FIG. 4, there are rectangular markers outside the circular patterns, and eight rectangular markers of projectors arranged adjacent to each other on the left and right are arranged in the order of two left rectangular markers of the left projector, two left rectangular markers of the right projector, two right rectangular markers of the left projector, and two right rectangular markers of the right projector. Based on such a positional relationship, it is possible to identify each of the circular patterns and rectangular markers. Note that other than using a positional relationship, for example, the color and shape of the rectangular markers in the taken image may be identified by changing the color and shape of the rectangular markers to be projected for each projector, and the determination may be made based on the identified features.

A description is given of a second mode illustrated in FIG. 5. The feature point extraction unit 132 extracts, from the calibration-use image obtained by taking the first calibration projection scene, in the arrangement of projected images, the grating points of the grating pattern projected by projectors of the first group (for example, the projectors in the odd number order). The feature point extraction unit 132 extracts, from the calibration-use image obtained by taking the second calibration projection scene, the grating points of the grating pattern projected by projectors of the second group (for example, the projectors in the even number order). Furthermore, the feature point extraction unit 132 extracts, from the respective calibration-use images obtained by taking the first calibration projection scene and the second calibration projection scene, the alignment points of the alignment pattern projected by a common projector 150.

In step S203, the grating point conversion unit 134 calculates a projection conversion coefficient for a predetermined pair of calibration-use images, based on the alignment point coordinates of the rectangular markers common to the taken images. In step S204, the grating point conversion unit 134 converts the grating point coordinates of the projected images of the respective projectors into a common coordinate system, and combines the grating point coordinates, based on the projection conversion coefficient calculated in step S203.

Figure 8:
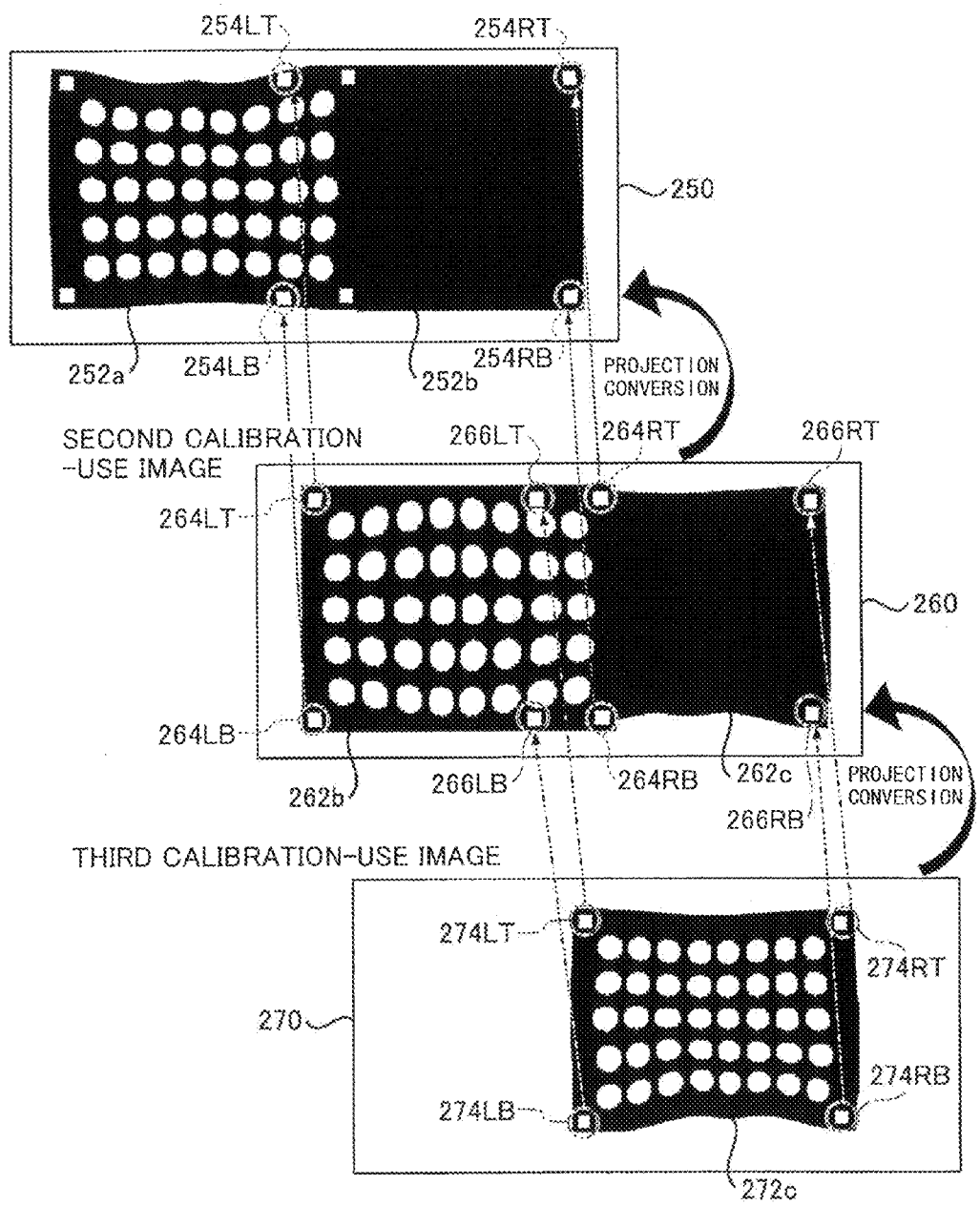
FIG. 8 is for describing three calibration-use images prepared by taking images of calibration projection scenes, and a projection conversion coefficient that is calculated among these taken images, in the first mode.
Figure 9:
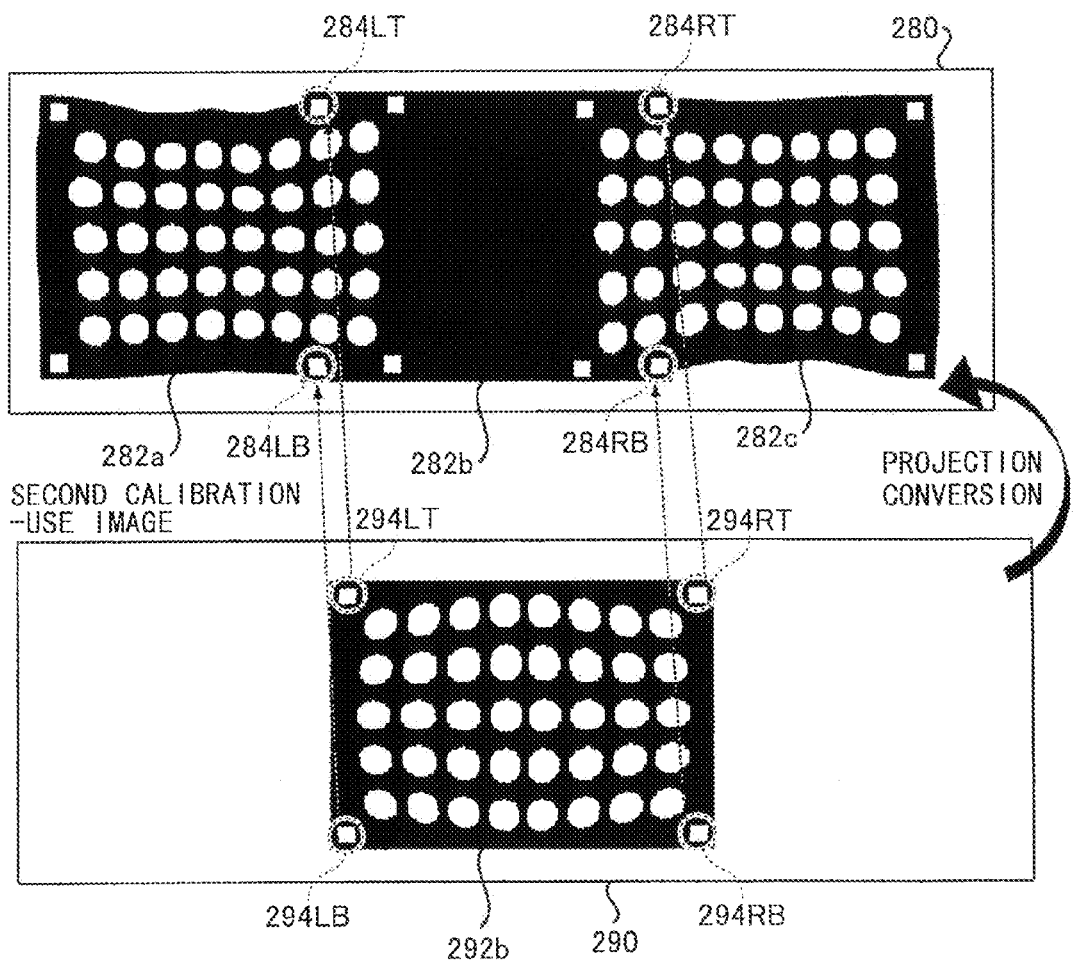
FIG. 9 is for describing two calibration-use images prepared by taking images of calibration projection scenes, and a projection conversion coefficient that is calculated among these taken images, in the second mode.

FIG. 8 is for describing three calibration-use images prepared by taking images of the calibration projection scenes, and the projection conversion coefficient that is calculated among these taken images, in the first mode. FIG. 9 is for describing two calibration-use images prepared by taking images of the calibration projection scenes, and the projection conversion coefficient that is calculated among these taken images, in the second mode.

In the first mode, as illustrated in FIG. 8, with respect to the pair of the first and second calibration-use images 250, 260, the pair of the alignment point coordinates are obtained, which are of the rectangular markers 254, 264 of the projected images 252b, 262b of the second projector 150b common to the taken images. Then, based on this pair of alignment point coordinates (254, 264), the grating point conversion unit 134 calculates the projection conversion coefficient for converting the coordinate system of the second calibration-use image 260 into the coordinate system of the first calibration-use image 250. Similarly, with respect to the pair of the second and third calibration-use images 260, 270, the pair of the alignment point coordinates are obtained, of the rectangular markers 264, 274 of the projected images 262c, 272c of the third projector 150c common to the taken images. Based on this pair of alignment point coordinates (264, 274), the grating point conversion unit 134 calculates the projection conversion coefficient for converting the coordinate system of the third calibration-use image 270 into the coordinate system of the second calibration-use image 260.

The conversion formula of projection conversion is expressed by the following Formula (1), and by eliminating the denominator and organizing Formula (1), Formula (1) can be expanded into a first-degree polynomial equation of Formula (2).

Formula (1)
$$u = \frac{x*a + y*b + c}{x*g + y*h + 1} \quad (1)$$
$$v = \frac{x*d + y*e + f}{x*g + y*h + 1}$$

Formula (2)
$$u = x*a + y*b + c - x*g*u - y*h*u \quad (2)$$
$$v = x*d + y*e + f - x*g*v - y*h*v$$

In the above Formulas (1) and (2), x, y express the planar coordinates before conversion, u, v express the planar coordinates after conversion, and the eight coefficients of a through h express projection conversion coefficients. In the above formulas, in order to calculate eight projection conversion coefficients which are unknown parameters, at least eight simultaneous equations are required; however, if there are four corresponding points of alignment in the two calibration-use images described above, eight conversion formulas can be generated. By solving the eight simultaneous equations, generated from the corresponding points of the four rectangular markers, it is possible to obtain the projection conversion coefficients a through h.

In the first mode, when the projection conversion coefficients a through h between the two pairs of taken images are calculated, the grating point conversion unit 134 executes projection conversion of converting the extracted grating points of the second calibration-use image into the coordinate system of the first taken image. Furthermore, the grating point conversion unit 134 executes projection conversion of converting the extracted grating points of the third calibration-use image, from the coordinate system of the third taken image into the coordinate system of the second taken image, and further executes projection conversion of converting the coordinate system of the second taken image into the coordinate system of the first taken image. Accordingly, the grating point coordinates of all of the projectors 150a through 150c are converted into a common coordinate system that is the coordinate system of the first calibration-use image taken by directly facing the screen, and are combined together.

In the second mode, as illustrated in FIG. 9, with respect to the pair of the first and second calibration-use images 280, 290, the pair of the alignment point coordinates are obtained, which are of the rectangular markers 284, 294 of the projected images 282b, 292b of the second projector 150b common to the taken images. Then, based on this pair of alignment point coordinates, the projection conversion coefficient is calculated, which is for converting the coordinate system of the second taken image 290 into the coordinate system of the first taken image 280. Based on the projection conversion coefficients a through h between one set of the calibration-use images, the grating point conversion unit 134 executes projection conversion of converting the extracted grating points of the second calibration-use image into the coordinate system of the first taken image, and converts the grating points into a common coordinate system.

Figure 10:
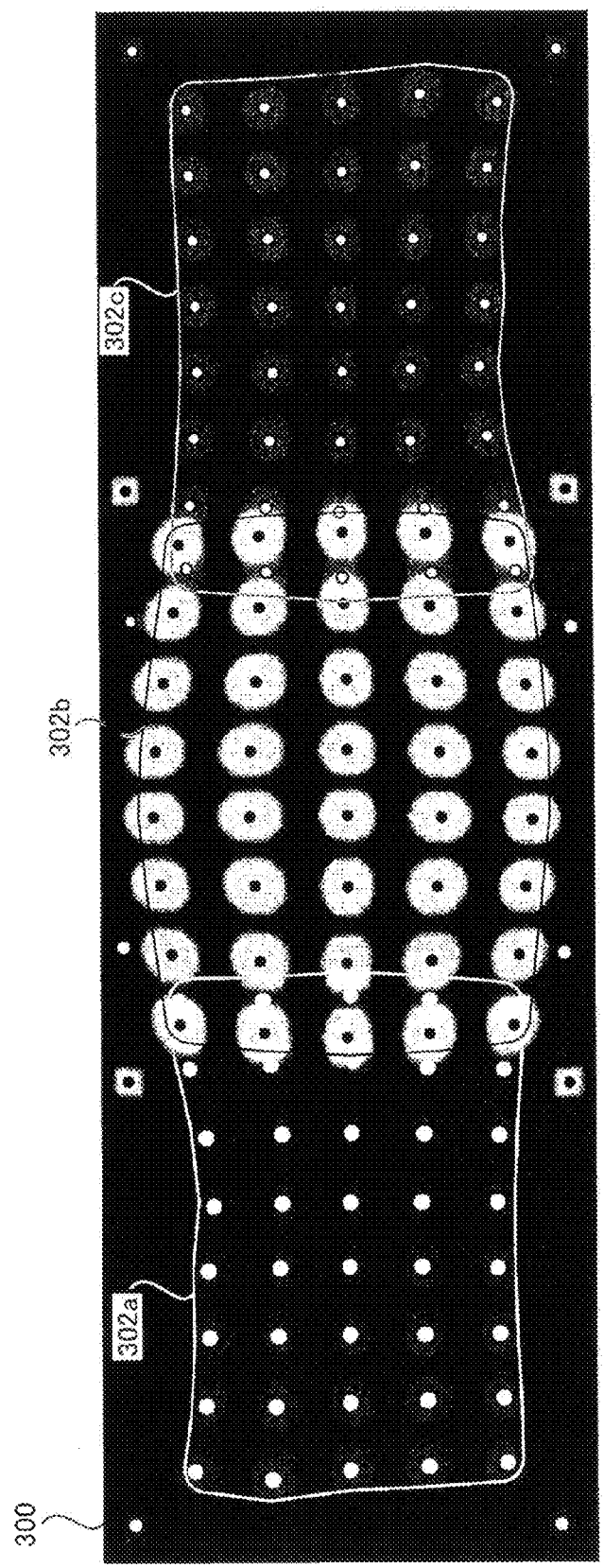
FIG. 10 schematically illustrates an assembly of grating point coordinates of projectors combined on a common coordinate system.

FIG. 10 schematically illustrates an assembly of grating point coordinates of the projectors combined on a common coordinate system 300. As illustrated in FIG. 10, the assemblies of grating point coordinates of the projectors 302a, 302b, and 302c are converted onto the common coordinate system 300 of the first calibration-use image, and are combined. Note that in FIG. 10, the circles of the plurality of projectors 150a through 150c for which images have been taken are expressed as overlapping each other; however, there is no need for the images per se to be overlapped.

Referring back to FIG. 7, in step S205, for each of the projectors 150, the geometric correction coefficient calculation unit 136 performs linear extrapolation on the grating point coordinates, which have been converted to the common coordinate system and combined, and calculates the outer periphery coordinates of the area where projection is possible (projection possible area).

Figure 11A:
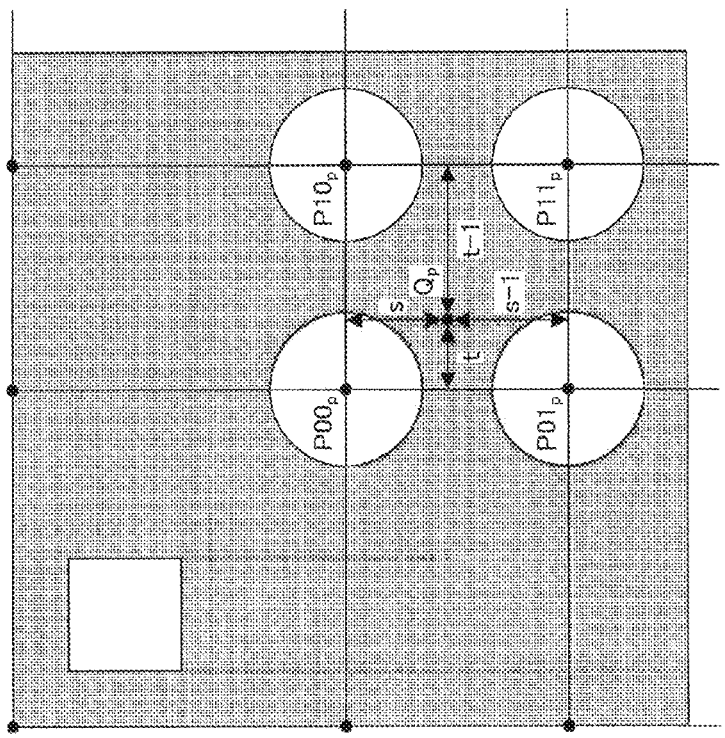
FIGS. 11A and 11B illustrate a method of calculating outer periphery coordinates of a projection possible area according to linear extrapolation by using grating point coordinates that have been combined.
Figure 11B:
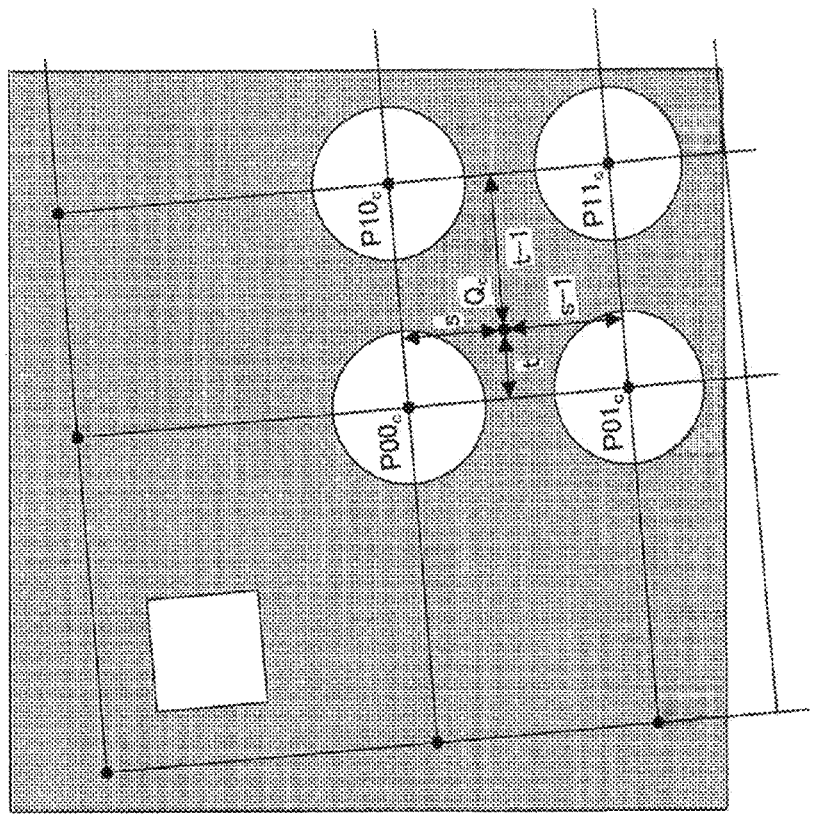

FIGS. 11A and 11B illustrate a method of calculating the outer periphery coordinates of the projection possible area (an area where projection is possible) according to linear extrapolation by using the grating point coordinates that have been combined. FIG. 11A illustrates the four grating points in the top left corner in the projector memory, and FIG. 11B illustrates the corresponding four grating points on the common coordinate system. As illustrated in FIG. 11A, the outer periphery coordinates in the projector memory (grating points in four corners and along four sides) are defined at a position where the quadrilateral patch of four grating points (for example, $P00_P$ through $P11_P$) positioned on the outer periphery, is extrapolated (a position at a distance that is 1.5 times that of the distance between grating points).

The coordinates of the outer periphery pixels (grating points in four corners and along four sides) corresponding to the projection possible area of each of the projectors in the common coordinate system, can be calculated by linearly extrapolating points from the four grating point coordinates positioned on the outer peripheral part, as illustrated in FIG. 11B. Similarly, the points on the common coordinate system corresponding to arbitrary coordinate points in the projector memory other than the outer periphery coordinates (grating points in four corners and along four sides) can be obtained by linearly extrapolating or interpolating points from the four grating point coordinates that are nearby.

It is assumed that an arbitrary coordinate point $Q_P$ in the projector memory is a point of internal division in the x axis direction by t:1−t (0<t<1) and in the y axis direction by s:1−s (0<s<1), in the four grating points $P00_P$, $P10_P$, $P01_P$, $P11_P$ whose coordinate positions are nearby in the projector memory. Then, a point $Q_C$ in the common coordinate system corresponding to the coordinate point $Q_P$, can be calculated by using the following Formula (3), from the coordinate vectors of the corresponding four grating points $P00_C$, $P10_C$, $P01_C$, $P11_C$. In the case of a point that is to be extrapolated, the point $Q_C$ can be calculated by setting the ranges of −1.5<t<0, −1.5<s<0 with respect to the above t and s, and using the following Formula (3).

Formula (3)

$$Q_C = (1-s)((1-t)/P00_C + tP10_C) + s((1-t)P01_C + tP11_C) \quad (3)$$

In the entire image, a non-linear geometric distortion may occur; however, in this case, it is assumed that the distortion is a linear geometric distortion in parts of the image, including the range of the quadrilateral patch constituted by grating points of 2×2, and the range where a predetermined amount of points have been extrapolated toward the outer periphery. This is because the size of the above quadrilateral patch can be deemed as being sufficiently small. Note that in the described embodiment, it is assumed that the corresponding points are calculated by linear interpolation by using the above Formula (3). However, in other embodiments, the point $Q_P$ in the projector memory can be associated with the corresponding point $Q_C$ in the common coordinate system, by projection conversion obtained by using four adjacent pairs of grating points $P00_C$, $P10_C$, $P01_C$, $P11_C$, $P00_P$, $P10_P$, $P01_P$, $P11_P$.

Figure 12:
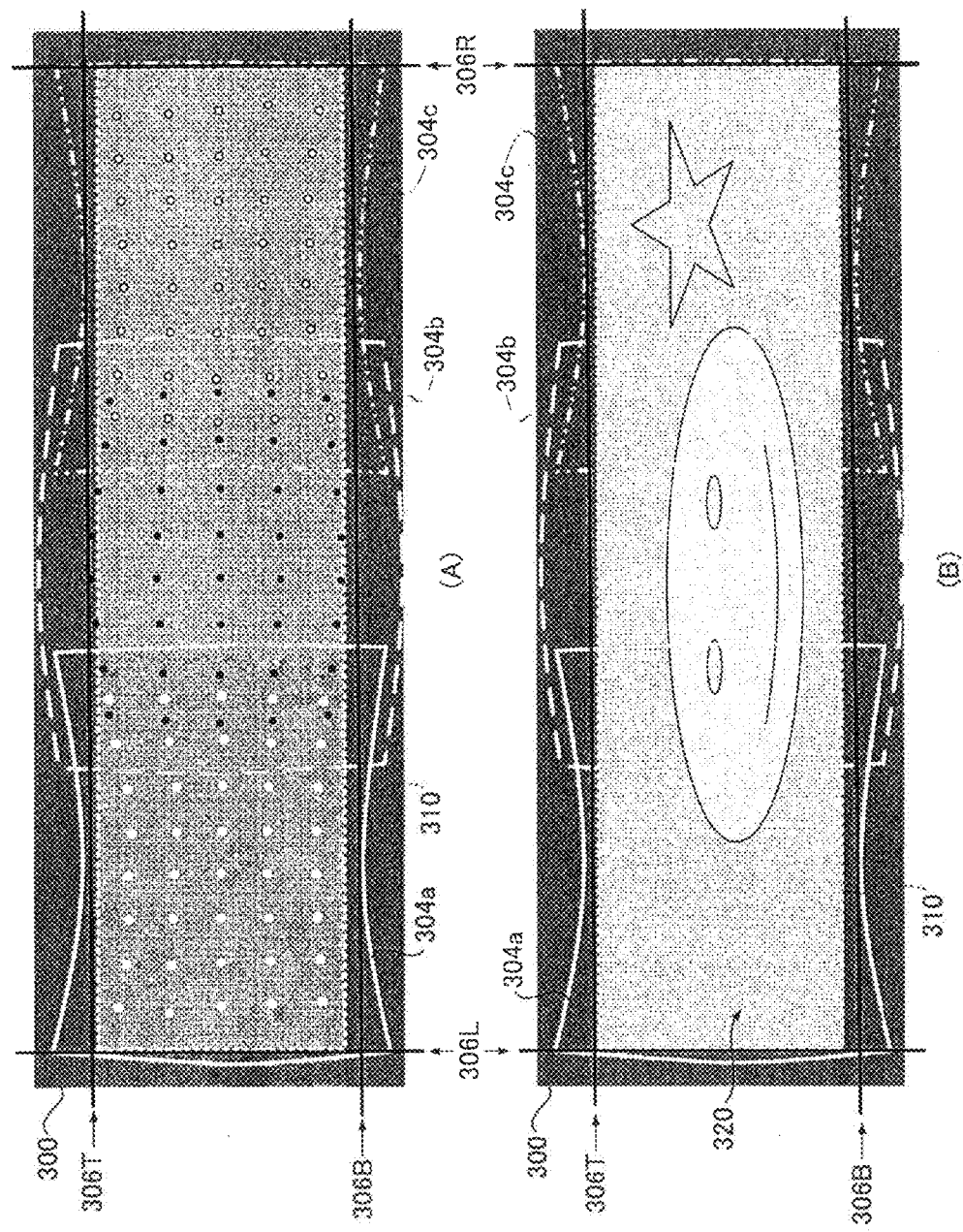
FIG. 12 is for describing projection possible areas of three projectors on the common coordinate system, a projection target area after correction, and a projection content image.

By performing the linear extrapolation described above for each projector, the projection possible areas of the three projectors 150a through 150c (i.e., the range where a white image can be entirely projected) are detected in the common coordinate system. FIG. 12 (A) expresses the projection possible areas 304a through 304c of three projectors detected in the common coordinate system 300. The projection possible area 304a of the first projector 150a is indicated by a solid white line, the projection possible area 304b of the second projector 150b is indicated by a dashed white line, and the projection possible area 304c of the third projector 150C is indicated by a dashed-two dotted line.

Referring back to FIG. 7, in step S206, the geometric correction coefficient calculation unit 136 obtains the logical sum (OR) of the projection possible areas of all projectors in the common coordinate system, and sets, in the area of the above logical sum, a projection target area after correction for mapping the content image. The projection target area after correction is set such that the content image can be mapped by the maximum size in the area that is the logical sum of the projection possible areas 304a through 304c of all projectors, while maintaining the aspect ratio.

The points of the four corners in each of the projection possible areas in the common coordinate system are known, and the four sides connecting these points (top side, bottom side, left side, right side) are obtained in a form of being linearly divided by the grating point width, and the range including these sides is recognized. Therefore, the rectangular range, which may be formed within the area of the three logical sums, is defined in a range sandwiched between the top side 306T and the bottom side 306B, and in the range sandwiched between the left side 306L and the right side 306R, of the projection possible areas 304a through 304c of the three projectors in the common coordinate system.

As indicated by the rectangular area indicated by a dashed line in FIG. 12 (A), the projection target area after correction 310 is an area that is assigned by the maximum size in the rectangular range having the four sides 306T, 306B, 306L, and 306R, while maintaining the aspect ratio (for example, M:N) of the content image. In the example of FIG. 12 (A), there are slight blank spaces in the vertical direction, and therefore margins are provided at the top and bottom, and the projection target area after correction is centered. Then, as illustrated in FIG. 12 (B), in the projection target area after correction 310, the content image 320 to be projected is pasted.

Referring back to FIG. 7, in the loop of steps S207 through S211, the processes of steps S208 through S210 are executed for each projector, and the geometric correction coefficients for each of the plurality of projectors are obtained. In step S208, the geometric correction coefficient calculation unit 136 converts the grating point coordinates in the common coordinate system to the coordinate system of the original content image. In the following, the content image to be pasted to the projection target area after correction 310 in the common coordinate system is referred to as a "projection content image", and the original content image that is the source of the projection content image is referred to as an "equal-magnification content image".

In step S209, the geometric correction coefficient calculation unit 136 associates the grating point coordinates in the projector memory with the pixel positions in the coordinate system of the equal-magnification content image, via the common coordinate system. In step S210, the geometric correction coefficient calculation unit 136 associates the integer pixel coordinates in the projector memory with the pixel positions in the coordinate system of the equal-magnification content image by linear interpolation, via the common coordinate system.

Figure 13:
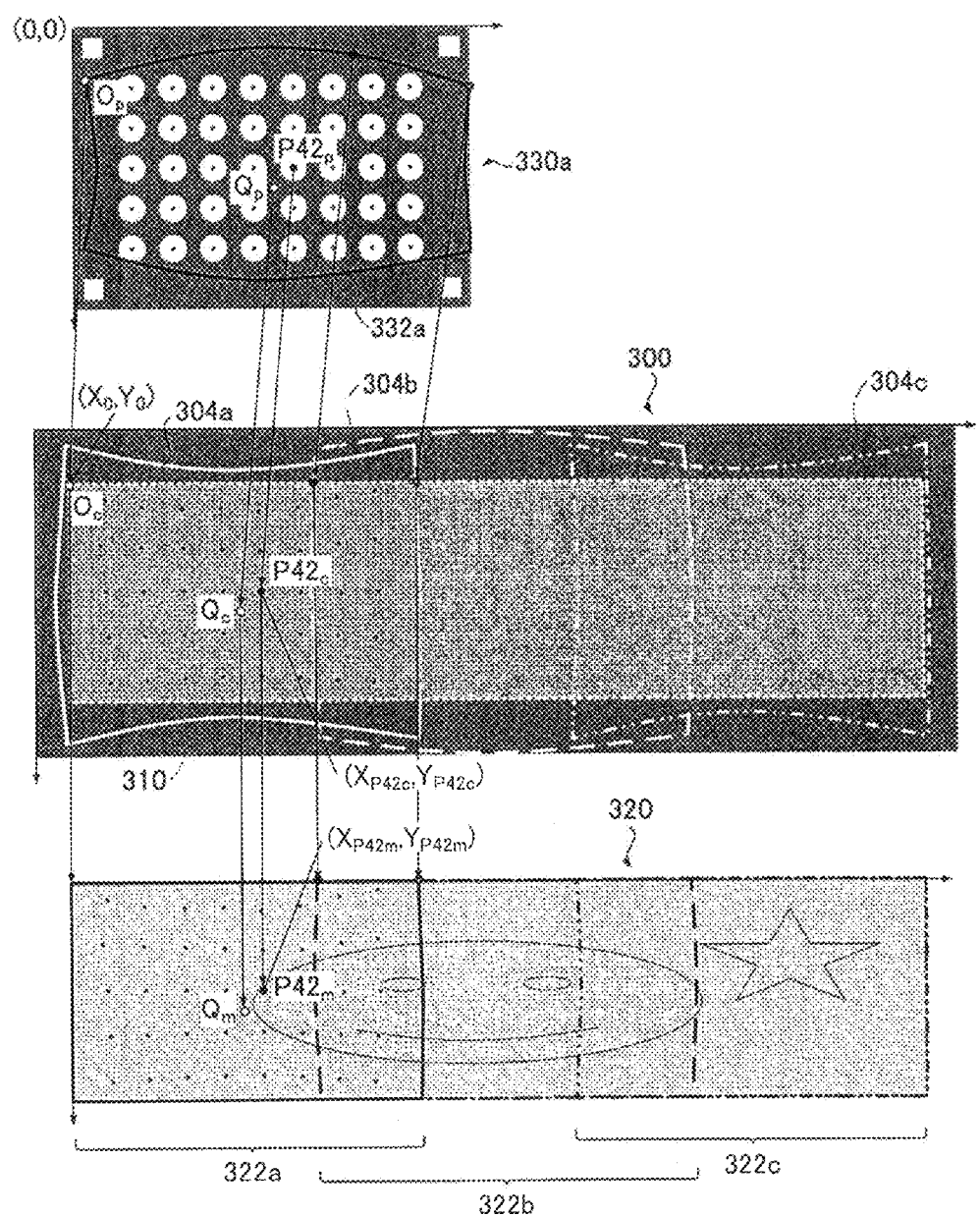
FIG. 13 is for describing the association of coordinates in the projector memory and coordinates on an equal-magnification content image corresponding to positions on a projection content image.

As illustrated in FIG. 13, the geometric correction coefficient calculated by the process of steps S208 through S210 are for associating the coordinates in a projector memory 330 with pixel positions in the equal-magnification content image corresponding to the positions in the projection content image.

A description is given of one grating point $P42_P$ in the projector memory 330a illustrated in FIG. 13, as a representative example. With respect to a grating point $P42_P$ in the projector memory 330, a corresponding point $P42_C$ ($X_{P42C}$, $Y_{P42C}$) in the common coordinate system 300 is extracted. Then the content image is mapped in the projection target area after correction 310, and therefore as illustrated in FIG. 13, with respect to the coordinate position $P42_C$ on the common coordinate system 300, a corresponding pixel position $P42_m$ ($X_{P42m}$, $Y_{P42m}$) in the equal-magnification content image is further defined.

The corresponding pixel position $P42_m$ ($X_{P42m}$, $Y_{P42m}$) on the equal-magnification content image can be calculated by the following Formula (4) from the coordinates ($X_{P42C}$, $Y_{P42C}$) of the corresponding point $P42_C$ on the common coordinate system 300. In the following Formula (4), the coordinates ($X_0$, $Y_0$) are coordinates of the origin point at the top left of the projection content image on the common coordinate system, and R expresses the magnification ratio of the content image. Note that in this example, as a matter of convenience, the equal-magnification content image is assumed to be directly mapped on the projection target area after correction 310 by a predetermined magnification ratio R; however, the method of mapping the content on the common coordinate system is not particularly limited.

Formula (4)

$$X_{P42m}=(X_{P42C}-X_0)/R$$

$$X_{P42m}=(Y_{P42C}-Y_0)/R \quad (4)$$

Similarly, with respect to all of the grating points $Pij_P$ other than the grating point $P42_P$ in the projector memory, the corresponding pixel position on the equal-magnification content image is calculated. As for arbitrary coordinates other than the grating points in the projector memory, the corresponding pixel position in the equal-magnification content image can be calculated by the same method as that described with reference to FIG. 11, by linearly interpolating (interpolating or extrapolating at the peripheral part) the corresponding pixel position on the content image of a nearby 2×2 grating point. Accordingly, the pixel position of the area 322a handled by the first projector 150a in the content image 320 is associated with the pixel of a predetermined area 332a in the projector memory 330a.

FIG. 17A illustrates an example of a data structure of a geometric correction coefficient of one projector calculated by the process of steps S208 through S210. As illustrated in FIG. 17A, the corresponding pixel position on the equal-magnification content image with respect to all pixels in the projector memory obtained as above, becomes the geometric correction coefficient.

The loop of steps S207 through S211 is repeated for the number of projectors, and when the association of the integer pixel coordinates in the projector memory and the coordinate system of the equal-magnification content image is completed for all of the projectors, the process proceeds to step S212. In step S212, the process is ended, and the process returns to the call source indicated in FIG. 8. Accordingly, a geometric correction coefficient is prepared for all of the respective projectors 150a through 150c.

Note that in the described embodiment, the corresponding pixel position on the equal-magnification content image is obtained for all pixels in the projector memory, as geometric correction coefficients; however, the present embodiment is not so limited. In other embodiments, pixel positions $Pij_m$ on the equal-magnification content image, with respect to the grating points $Pij_P$ in the projector memory, are obtained as the geometric correction coefficients, and the correction processing unit 114 described below may calculate the coordinates other than the grating points by performing projection conversion or linear conversion for each quadrilateral patch.

Calculation of Blending Coefficient

Figure 14:
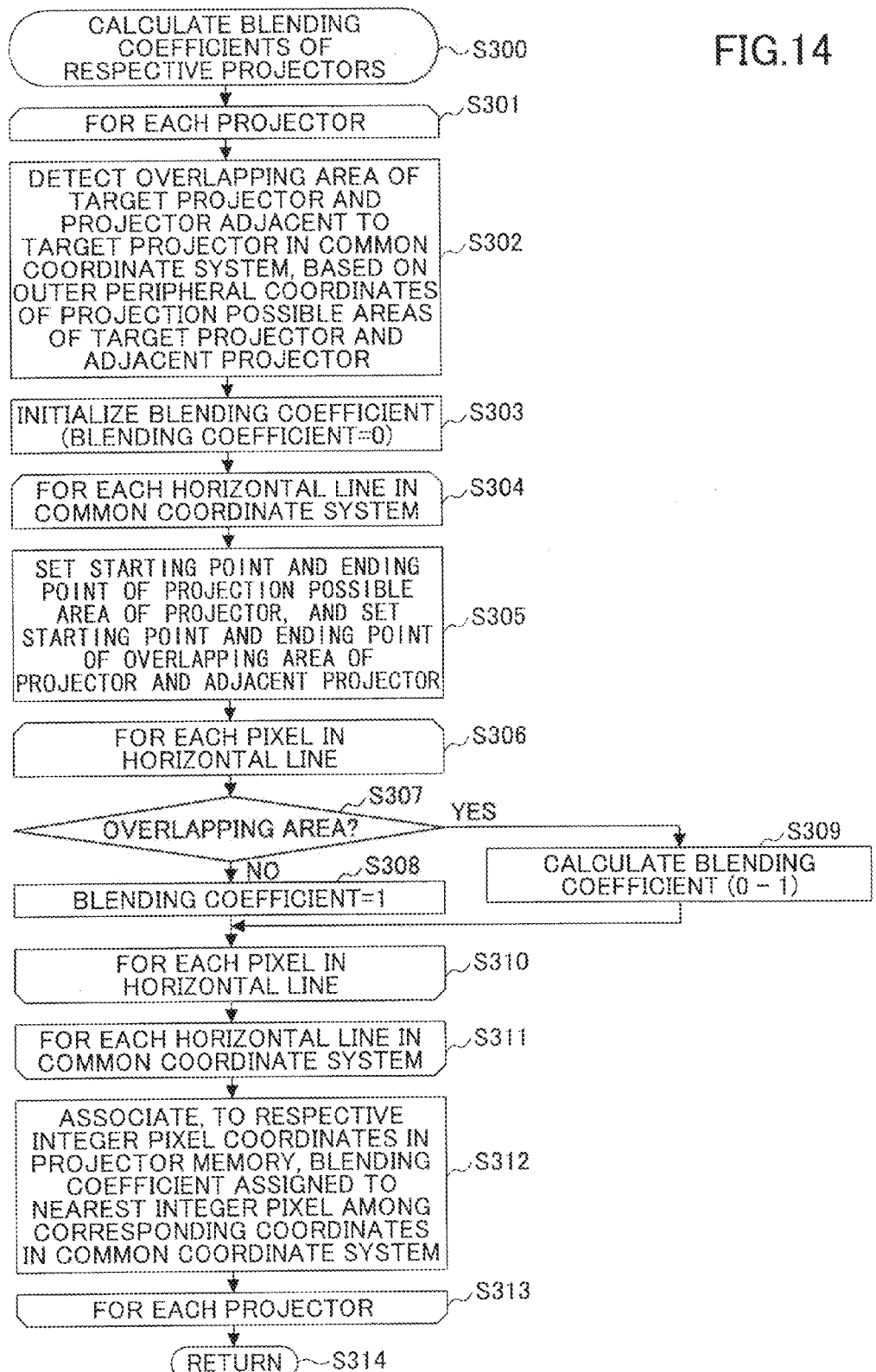
FIG. 14 is a flowchart of a process of calculating a blending coefficient executed by a correction coefficient calculation unit, according to the embodiment.

With reference to FIGS. 14 through 17, a description is given of details of the process of calculating the blending coefficient of each projector. FIG. 14 is a flowchart of a process of calculating a blending coefficient executed by the correction coefficient calculation unit 130, according to the present embodiment. The process of FIG. 14 is started from step S300 when the process is called in step S110 of FIG. 6. In the loop of steps S301 through S313, the processes of steps S302 through S312 are executed for each target projector, and a blending coefficient is obtained for each of the plurality of projectors 150a through 150c.

Figure 15:
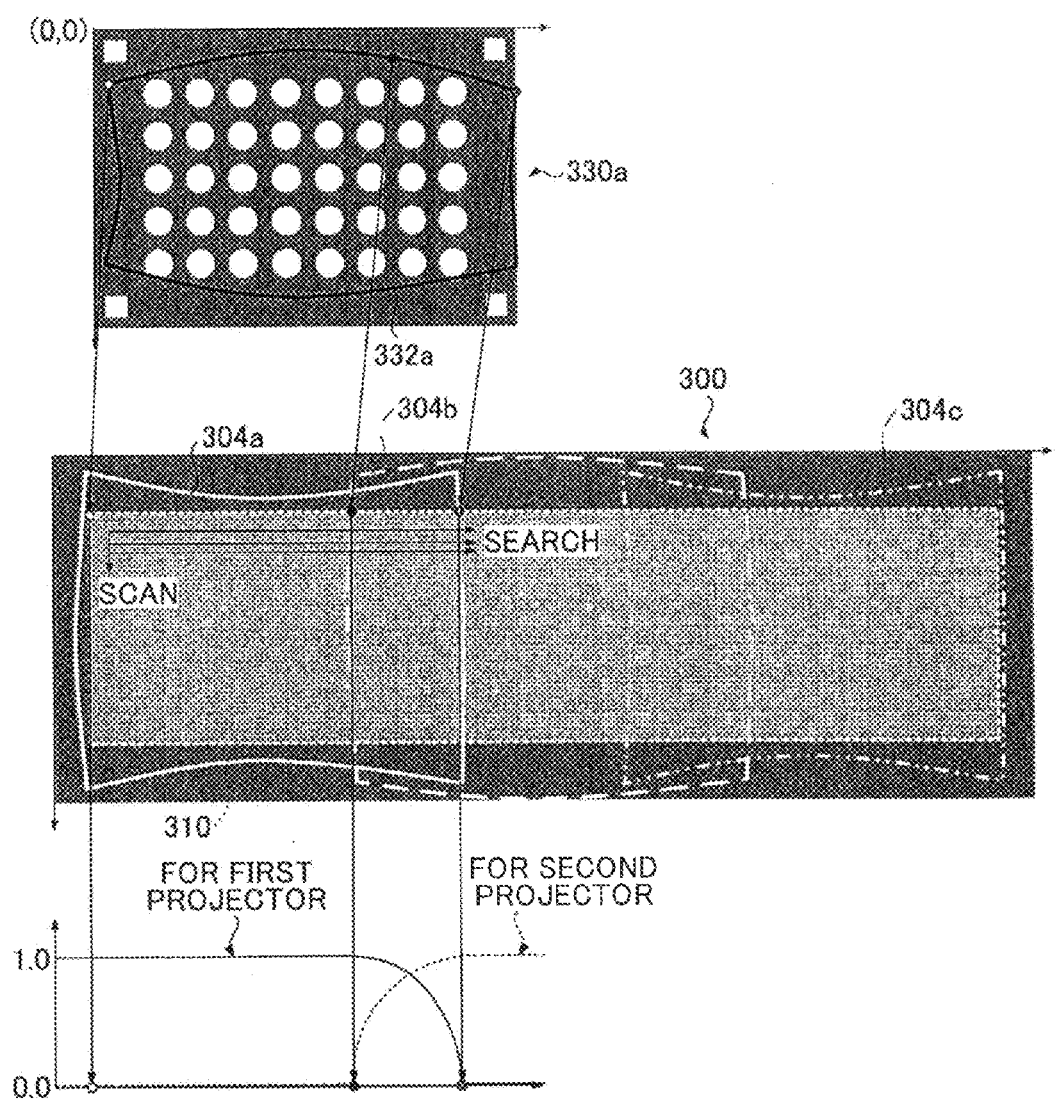
FIG. 15 is for describing the association of blending coefficients with respect to coordinates in the projector memory.

In step S302, the blending coefficient calculation unit 138 detects the overlapping area of the target projector and a projector adjacent to the target projector in the common coordinate system 300, based on the outer peripheral coordinates of the projection possible areas of these projectors. FIG. 15 is for describing the association of blending coefficients with respect to the coordinates in the projector memory 330. As illustrated in FIG. 15, in the top side of the projection target area after correction 310 in the common coordinate system 300, by searching from the left origin point (○) to the right direction, the starting point (●) and the ending point (◎) of the overlapping area of the first projector 150a and the second projector 150b are detected. Similarly, for other horizontal lines, the starting point and the ending point of the overlapping area are detected.

Referring back to FIG. 14, in step S302, the blending coefficient calculation unit 138 first initializes the blending coefficients with respect to the coordinates of the common coordinate system, by zero. In the loop of steps S304 through S311, the processes of steps S305 through S310 are executed for each of the horizontal lines in the common coordinate system (only the part corresponding to the projection target area after correction). By the processes of steps S305 through S310, the intermediate result of the blending coefficient is assigned to each coordinate position on the common coordinate system.

In step S305, in the target horizontal line, based on the above peripheral coordinates of the projection possible area and the detected overlapping area, the starting point and the ending point of the projection possible area of the projector, and the starting point and the ending point of the overlapping area of the projector and the adjacent projector, are set.

In the loop of steps S306 through S310, the processes of steps S307 through S309 are executed for each pixel in the horizontal line of the common coordinate system (only inside the projection possible area). By the processes of steps S307 through S309, a blending coefficient is determined for each pixel on the common coordinate system in the horizontal line.

In step S307, the blending coefficient calculation unit 138 branches the process according to whether the target pixel corresponds to the overlapping area. In step S307, when the blending coefficient calculation unit 138 determines that the target pixel does not correspond to the overlapping area (NO), the process proceeds to step S308. In this case, the pixel corresponds to a single projection possible area that does not overlap with other areas, and therefore in step S308, the blending coefficient calculation unit 138 determines the blending coefficient to be the maximum value 1. Meanwhile, in step S307, when the blending coefficient calculation unit 138 determines that the target pixel corresponds to the overlapping area (YES), the process proceeds to step S309. In this case, the pixel corresponds to an area overlapping with the adjacent projector, and therefore in step S309, the blending coefficient calculation unit 138 calculates the blending coefficient according to a predetermined relational expression.

Figure 16:
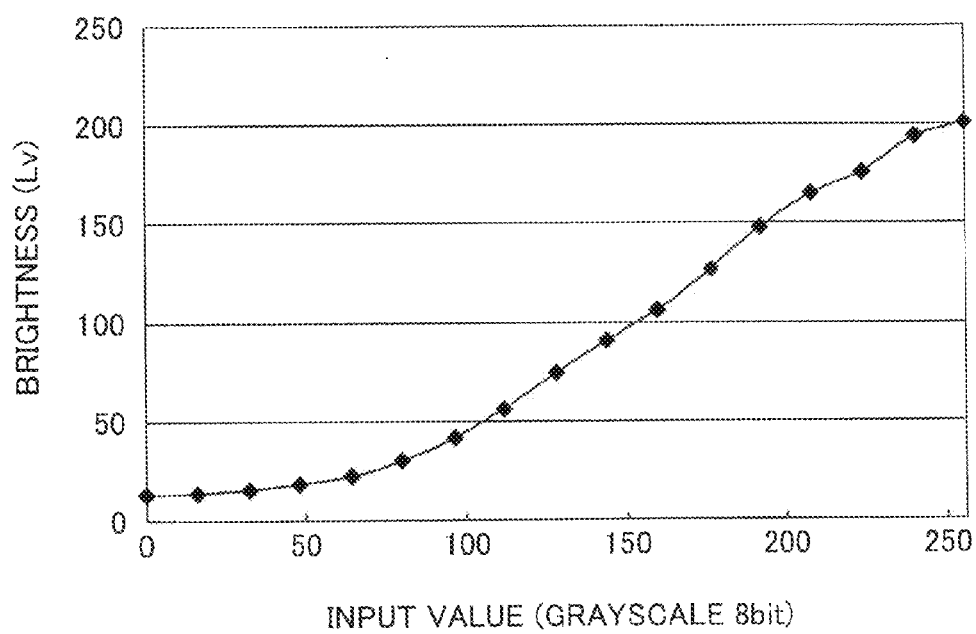
FIG. 16 illustrates a graph of input output properties of a projector.

FIG. 16 illustrates a graph of input output properties of a projector; however, the input output properties of a projector are typically not linear. In the calculation of the blending coefficient for the pixel corresponding to the above overlapping area, inverse correction is first performed on the input output properties so that the input output properties become linear, and then weighting is performed such that the light amount from the projectors on both sides becomes a total of one.

Specifically, as indicated for the first projector in the graph at the bottom of FIG. 15, for the pixels in the range from the origin point (○) to the starting point (●) of the overlapping area, the blending coefficient is determined to be a maximum of one in step S308 described above. Meanwhile, for the pixels in the range from the starting point (●) to the ending point (◎) of the overlapping area, in step S309, the blending coefficient is calculated by performing inverse correction on the input output properties of the projector, such that the actual brightness gradually decreases from 1.0 to zero in a linear manner, according to the horizontal distance from the starting point (●). If the input output properties are as illustrated in FIG. 16, the blending coefficient y for the horizontal distance x (0.0≤x≤1.0) from the starting point, which is normalized by the distance from the starting point to the ending point, can be calculated by the following Formula (5).

Formula (5)

$$y = 1.0 - x^{0.5} \quad (5)$$

By the loop of steps S304 through S311, the intermediate result of the blending coefficient is determined for each of the integer pixels in the common coordinate system. In areas other than the projection possible area, zero is set by the initialization process of step S303. When processes for all horizontal lines in the common coordinate system are completed by the loop of steps S304 through S311, the process proceeds to step S312. With respect to the horizontal lines outside the projection target area after correction, the pixels are set to zero by the initialization process of step S303.

In step S312, the blending coefficient calculation unit 138 associates, to the respective integer pixel coordinates in the projector memory, the blending coefficient assigned to the nearest integer pixel among the coordinates (decimal points) of the common coordinate system associated by the data structure illustrated in FIG. 17A. FIG. 17B illustrates an example of a data structure of blending coefficients of a single projector calculated by the process of steps S302 through S312. As illustrated in FIG. 17B, the blending coefficients of all pixels of the projector memory are obtained.

When the process for all projectors are completed by the loop of steps S301 through S313, the present process is ended in step S314, and the process returns to the call source indicated in FIG. 6.

By the above process, for each of the plurality of projectors 150a through 150c, blending coefficients for all pixels of the projector memory are obtained. Note that in the above description, the overlapping area of the first projector 150a and the second projector 150b is described. When the second projector 150b is the target, the first projector 150a and the third projector 150c on the left and right are combined, and blending coefficients for the two overlapping areas are calculated.

Correction Process

In the following, with reference to FIGS. 17A through 18, a description is given of details of the correction process based on the above correction coefficient. FIG. 18 is for describing a correction process based on the above correction coefficient. The above-described geometric correction coefficients of the projectors calculated by the geometric correction coefficient calculation unit 136, and the above-described blending coefficients of the projectors calculated by the blending coefficient calculation unit 138, are set in the respective correction processing units 114 in step S111 of FIG. 6.

First, the correction processing unit 114 prepares the association data for associating all of the pixels of the projector memory with the corresponding pixel positions on the equal-magnification content image. When the pixel positions with respect to all pixels of the projector memory as illustrated in FIG. 17A have been obtained by the process by the geometric correction coefficient calculation unit 136 described above, the correction processing unit 114 directly reads the association data illustrated in FIG. 17A. When only the pixel positions on the equal-magnification content image for each grating point coordinate of the projector memory are given, the coordinates on the equal-magnification content image to be referred are calculated by linear interpolation from the coordinates of the grating points for all pixels in the projector memory other than the grating points, and the association data as illustrated in FIG. 17A is calculated.

The correction processing unit 114 generates an intermediate image from the equal-magnification content image to be projected, by a pixel interpolation method such as bi-linear and bi-cubic, based on the pixel positions (decimal points) on the equal-magnification content image to be referred to for each pixel in the projector memory. Furthermore, the correction processing unit 114 multiplies the pixel values of the respective colors R, G, B in the generated intermediate image, by the blending coefficient associated by the association data of FIG. 17B, and generates the final projection image.

FIG. 18 illustrates projection images 350a through 350c which have been finally obtained from the content image for the three projectors 150a through 150c, by the correction processing units 114a through 114c. As illustrated in FIG. 18, in the projection mode, these projection images 350a through 350c are projected from the projectors 150. In the projection image 350, the part of the content image to be handled by the corresponding projector 150 is subjected to various calibrations, and therefore the projected images of the projection images 350a through 350c are superposed on the projection surface in a preferable manner, and combined into a single projected image 352.

Modification Example of Calibration Scene Selection Unit

In the following, with reference to FIGS. 19A through 23, a description is given of a modification example of the embodiment. In the above, a description is given of arranging projected images in a row in a horizontal direction or a vertical direction and performing multi-projection. In FIGS. 19A through 23, a description is given by generalizing to multi-projection in which projected images are arranged in a two-dimensional grating form (ij).

Figure 19B:
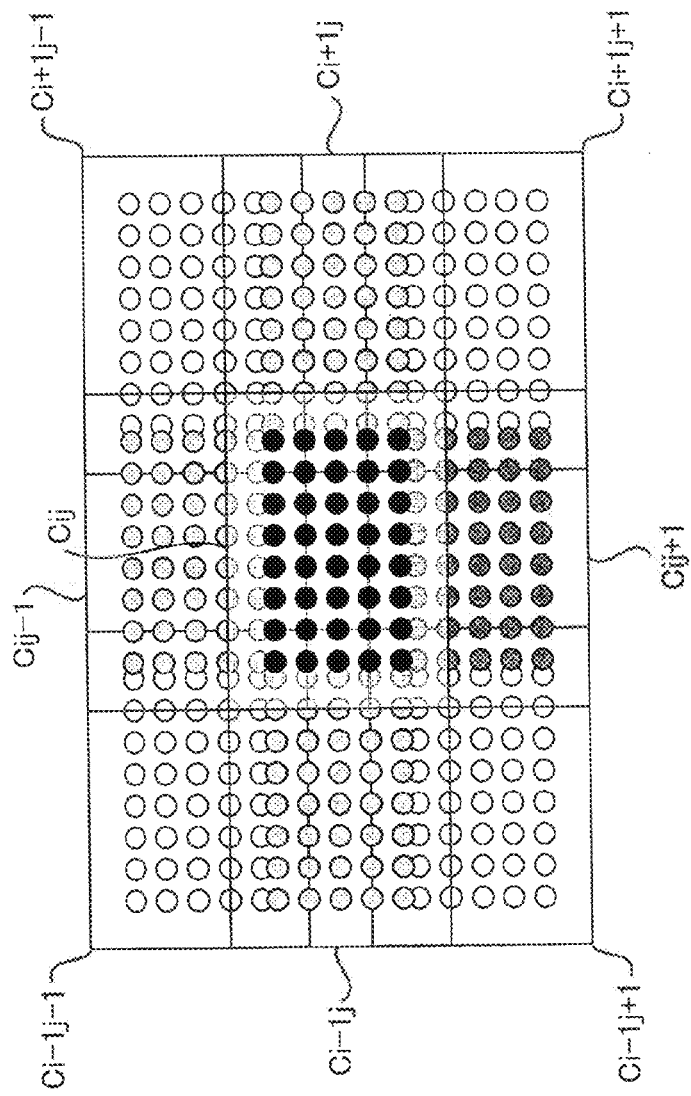
FIG. 19B illustrates the overlapping of grating patterns.
Figure 19A:
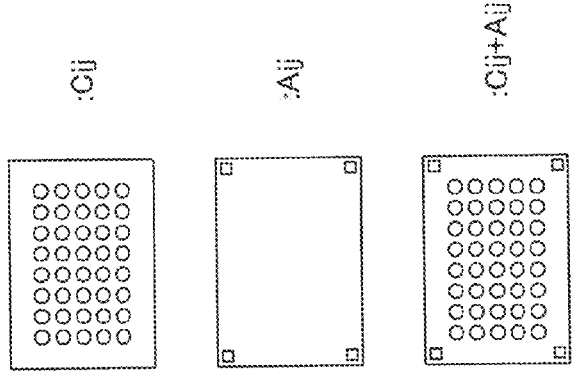
FIG. 19A illustrates examples of a first calibration image Cij, a second calibration image Aij, and a third calibration image Cij+Aij.

In this modification example of the embodiment also, the calibration scene selection unit 120 reads the respective calibration images from the calibration image storage unit 118, and selects an appropriate calibration image and outputs the selected calibration image to the plurality of projectors 150a through 150c. In this modification example of the embodiment, there are two types of calibration images as illustrated in FIG. 19A; a first calibration image Cij including only a grating pattern, and a second calibration image Aij including only an alignment pattern. The alignment pattern is preferably arranged at a position around the area where the grating pattern is arranged. A third calibration image is also used, which is provided as a calibration image Cij+Aij obtained by combining the first calibration image Cij and the second calibration image Aij.

The calibration scene selection unit 120 has recognized the positional relationships of the projected images of the plurality of projectors ij, and in order to obtain calibration results of the projectors 150 overall without deficiencies, and the calibration scene selection unit 120 prepares the plurality of calibration projection scenes such that the following conditions (A) through (D) are satisfied.

The first condition (A) is a condition that in the arrangement of projected images, projectors 150 that are adjacent to each other do not project grating patterns at the same time in the same scene. That is to say, as illustrated in FIG. 19B, when the grating pattern Cij is projected from a projector ij in one scene, the grating patterns of the eight projectors adjacent to the projector ij cannot be projected. By preparing a plurality of calibration projection scenes to satisfy the first condition (A), it is possible to prevent the grating patterns of adjacent projectors from overlapping each other.

The second condition (B) is a condition that in all of the plurality of calibration projection scenes, at least one grating pattern Cij of all projectors participating the multi-projection, is included. By preparing a plurality of calibration projection scenes to satisfy the second condition (B), it is possible to ensure that distortion correction is performed on the projected image of all projectors ij.

The third condition (C) is a condition that one calibration projection scene includes an alignment pattern Aij projected from a projector ij that is common to the one calibration projection scene and at least one of the other calibration projection scenes. The fourth condition (D) is a condition based on the assumption of the third condition (C), and that in all of the plurality of calibration projection scenes, when scenes are connected based on an alignment pattern Aij common to the scenes, the calibration projection scenes are used as nodes and the above-described connection is used as a link to form a single tree structure. Forming a tree structure by using the calibration projection scenes as nodes and using the connection as a link, means that the scenes can be combined in a coordinate system of a calibration-use image obtained by taking an image of one scene that is the route. Therefore, by preparing a plurality of calibration projection scenes to satisfy the third condition (C) and the fourth condition (D), it is ensured that the coordinates of the calibration-use images obtained by taking images of all of the scenes can be combined in the common coordinate system.

Figure 20:
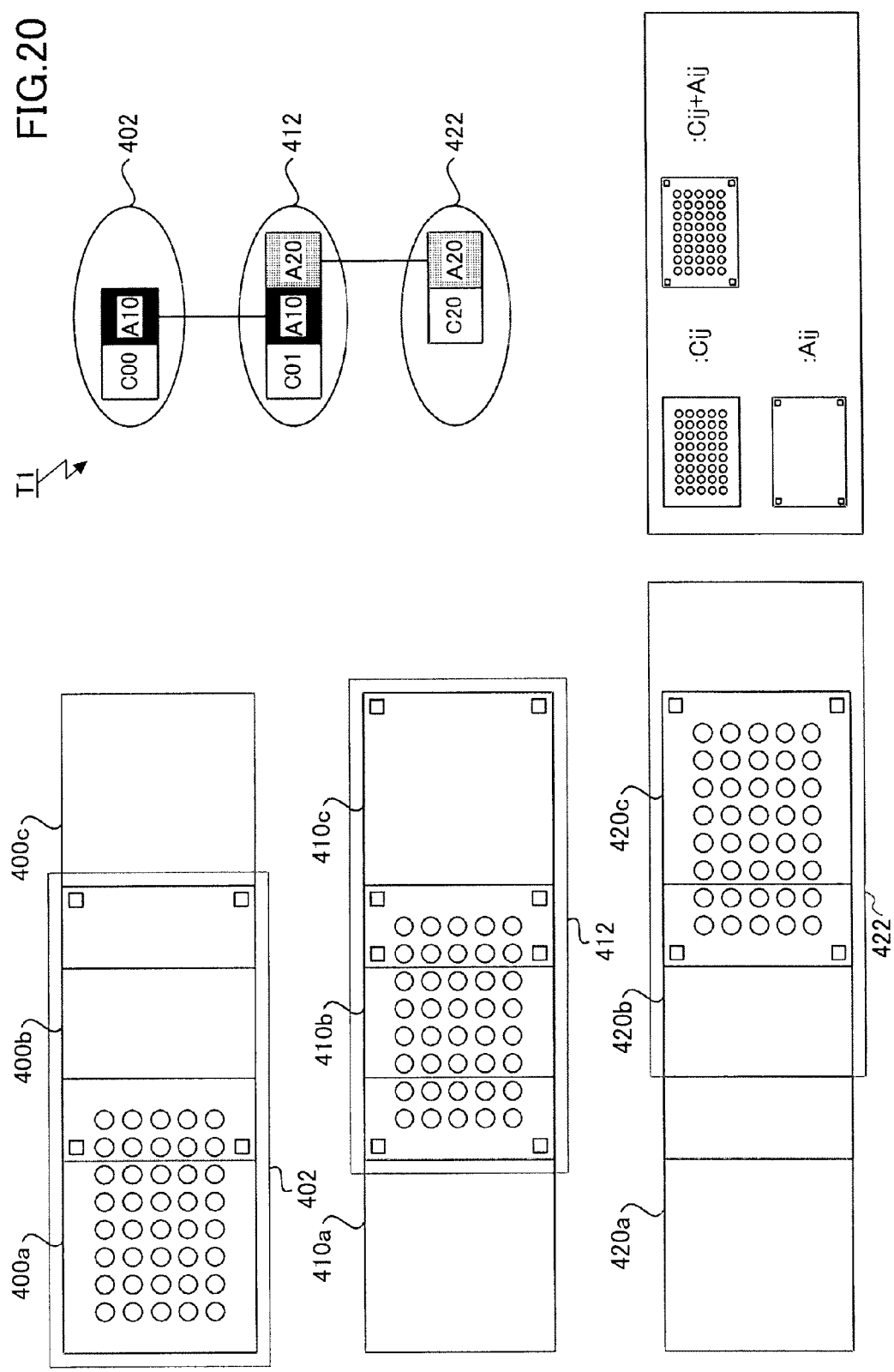
FIG. 20 illustrates an example where three projected images are connected in the horizontal direction, and a method of taking an image of these projected images.
Figure 21:
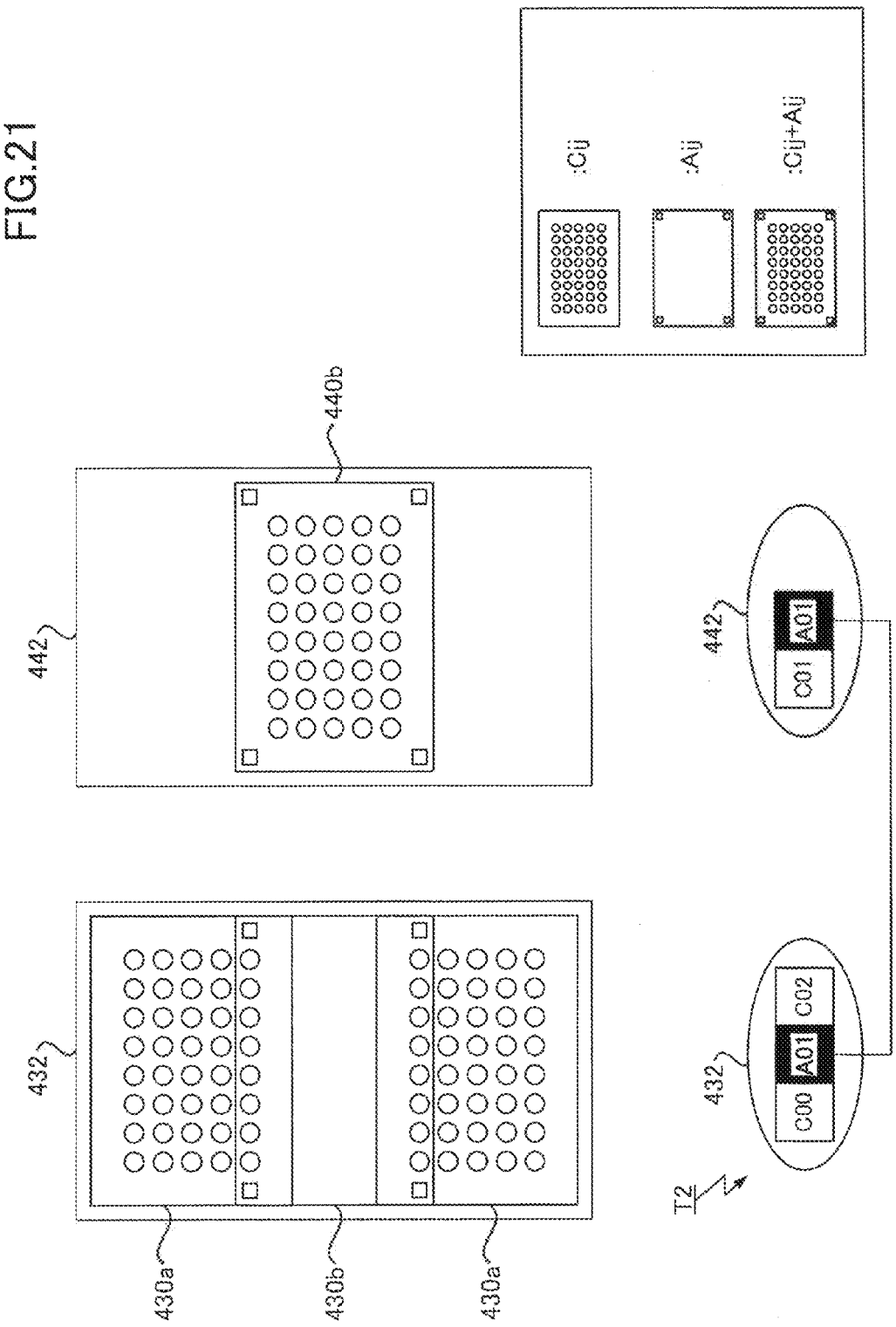
FIG. 21 illustrates an example where three projected images are connected in the vertical direction, and a method of taking an image of these projected images.

FIGS. 20 and 21 are for describing the calibration projection scenes formed to satisfy the conditions (A) through (D), and a method of taking images of the scenes. FIG. 20 illustrates an example where three projected images are connected in the horizontal direction, and FIG. 21 illustrates an example where three projected images are connected in the vertical direction.

In the mode illustrated in FIG. 20, three calibration projection scenes are prepared, which correspond to three taken images. The three calibration projection scenes 402, 412, 422 are linked by alignment patterns A10 and A20 which are included in and common to the calibration images 400b, 410b and calibration images 410c, 420c, and constitute a single tree structure T1. In the mode of FIG. 20, it is necessary to take images of the scenes three times; however, the camera 160 can perform imaging by an angular field in which projected images of two projectors can fit.

In the mode of FIG. 21, two calibration projection scenes are prepared, corresponding to images taken two times. The two calibration projection scenes 432, 442 are linked by an alignment pattern A01 which is included in and common to the calibration images 430b, 440b, and constitute a single tree structure T2. In the mode of FIG. 21, the camera 160 needs to perform imaging by an angular field in which projected images of three projectors can fit; however, images of the scenes only need to be taken two times.

Figure 22:
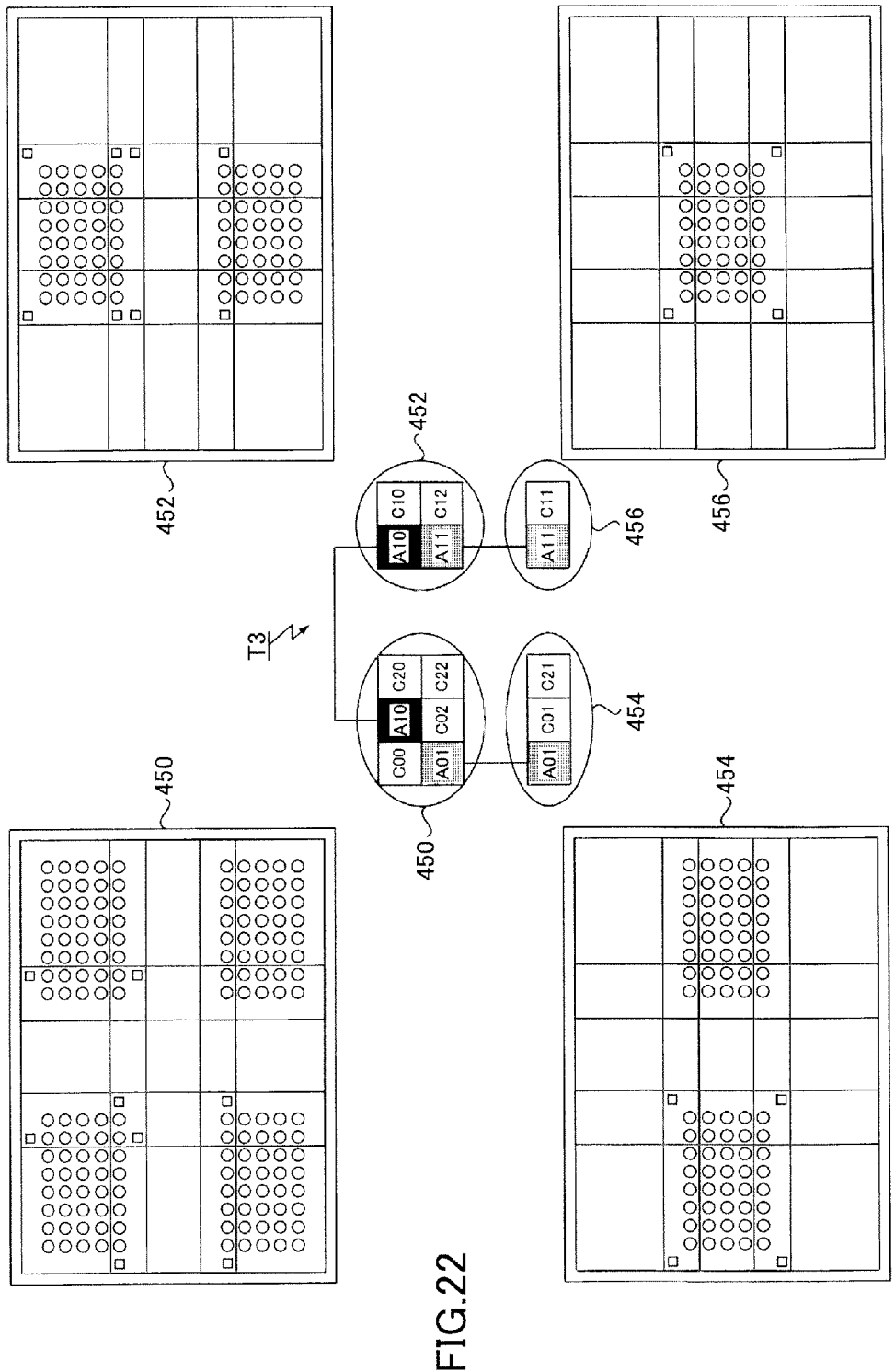
FIG. 22 illustrates a calibration projection scene of projected images in three lines and three rows, and a method of taking images by prioritizing the frequency of taking images.
Figure 23:
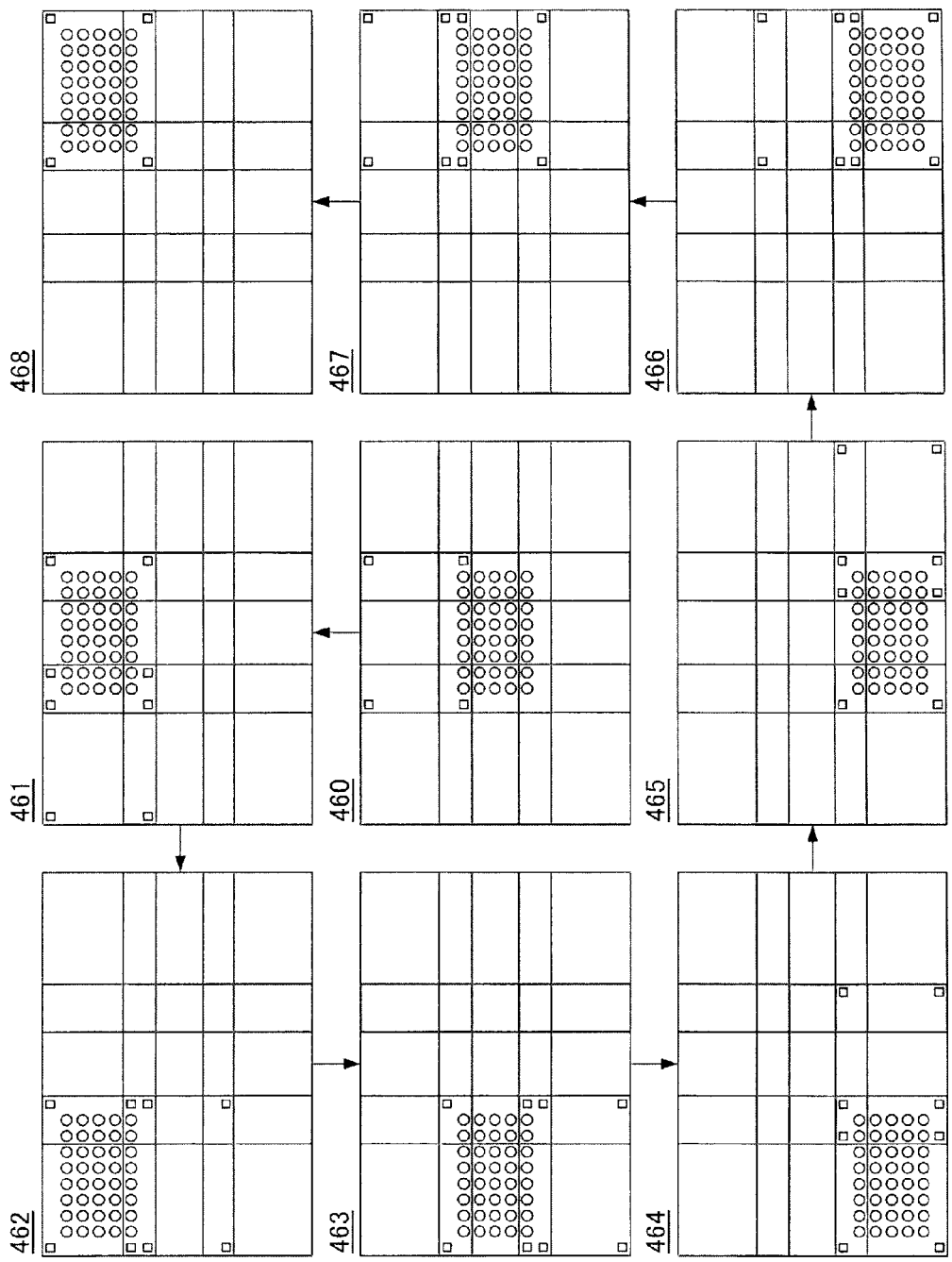
FIG. 23 illustrates a calibration projection scene of projected images in three lines and three rows, and a method of taking an image by prioritizing the angular field.

FIGS. 22 and 23 are for describing the calibration projection scenes formed to satisfy the conditions (A) through (D), and a method of taking images of the scenes. FIGS. 22 and 23 respectively illustrate an example where nine projectors are used to connect the projected images in three lines and three rows. FIG. 22 illustrates an example in which the entire screen of 3×3 is fit in the angular field of the camera 160 and an image of the scene is taken four times. FIG. 23 illustrates an example in which two screens of 1×2 or 2×1 are is fit in the angular field and an image of the scene is taken nine times.

In the mode of FIG. 22, four calibration projection scenes are prepared, which correspond to four taken images. In the calibration projection scenes 450, 452, 454, 456 illustrated in FIG. 22, grating patterns are not projected simultaneously from projectors that are adjacent to each other, and the first condition (A) is satisfied. Furthermore, all of the calibration projection scenes 450, 452, 454, 456 include one of each of all of the grating patterns Cij (ij=00 through 22) of the projectors ij, and the second condition (B) is satisfied. Furthermore, by the alignment patterns common to the scenes indicated by A01, A10, and A11, the four calibration projection scenes 450, 452, 454, 456 constitute the tree structure T3, and the third condition (C) and the fourth condition (D) are satisfied. In the mode illustrated in FIG. 22, the camera 160 needs to perform imaging by an angular field in which projected images of 3×3 projectors can fit; however, images of the scenes only need to be taken four times.

Meanwhile, in the mode of FIG. 23, nine calibration projection scenes are prepared, which correspond to nine taken images. In the calibration projection scenes 460 through 468 illustrated in FIG. 23, in an arrangement of three lines and three rows, images are taken by fitting two projectors in the angular field in a unicursal manner from the center toward the outer periphery. Then, the n (1≤n≤N−1)th calibration projection scene is prepared, such that one of the projectors arranged adjacent to each other projects an alignment pattern (the first projector does not necessarily need to project an alignment pattern) and at least a grating pattern, and the other one of the projectors projects an alignment pattern Aij. Therefore, the calibration projection scenes 460 through 468 have a tree structure, and the first to fourth conditions are satisfied. In the mode of FIG. 23, it is necessary to take images of the scenes nine times; however, the camera 160 can perform imaging by an angular field in which projected images of two projectors can fit.

Hardware Configuration

In the following, a description is given of a hardware configuration of the image processing device 110 according to the above embodiment, with reference to FIG. 24. The image processing device 110 is typically constituted as a general-purpose computer. FIG. 24 illustrates a hardware configuration of a general-purpose computer according to the present embodiment.

The general-purpose computer 110 is, for example, a desktop personal computer or a workstation. The general-purpose computer 110 of FIG. 24 includes a CPU (Central Processing Unit) 12, a north bridge 14 that handles the connection of the CPU 12 and a memory, and a south bridge 16. The south bridge 16 is connected with the north bridge 14 via an exclusive-use bus or a PCI bus, and handles the connection with I/O such as the PCI bus and a USB memory.

To the north bridge 14, a RAM (Random Access Memory) 18 for providing a work area of the CPU 12, and a graphic board 20 for outputting image signals are connected. The graphic board 20 is connected to a display 50 or the above projector 150, via an image output interface such as an analog RGB, HDMI (High-Definition Multimedia Interface; HDMI and High-Definition Multimedia Interface are registered trademark or trademark), DVI (Digital Visual Interface), DisplayPort (registered trademark)

To the south bridge 16, a PCI (Peripheral Component Interconnect) 22, a LAN port 24, IEEE 1394, a USB (Universal Serial Bus) port 28, a secondary storage device 30, an audio input output 32, and a serial port 34 are connected. The secondary storage device 30 is, for example, a HDD (Hard Disk Drive) or a SSD (Solid State Drive), and stores an OS for controlling the computer device, programs for realizing the above functional units, various kinds of system information, and various kinds of setting information. The LAN port 24 is an interface device for connecting the general-purpose computer 110 to a network by wired or wireless connection.

To the USB port 28, an input device such as keyboard 52 and a mouse 54 may be connected; the USB port 28 may provide a user interface for receiving input of various instructions from the operator. The general-purpose computer 110 according to the present embodiment reads programs from the secondary storage device 30 and loads the programs in the work space provided by the RAM 18, to realize the functional units and the processes described above under the control of the CPU 12. Note that the projector 150 and the camera 160 are not particularly described, but also includes hardware such as a CPU and a RAM, and hardware according to particular purposes.

By the configuration of the embodiments described above, it is possible to define a coordinate system of a projector memory (output image) among projectors that are adjacent to each other, to make it easy to avoid the overlapping of grating patterns used for detecting a distortion in the projected image. Thus, compared to a case that requires image processing for pattern separation, patterns can be precisely extracted, and geometric correction and blending correction can be performed with high precision.

Furthermore, by providing the markers of the alignment pattern on the outside of the grating pattern, it is easy to project the alignment pattern and the grating pattern without overlapping each other. Thus, it is possible to highly-precisely combine the grating point coordinates of the calibration-use images, which have been taken in a divided manner (by dividing the image) over a plurality of times. Furthermore, the alignment pattern is used to combine the calibration-use images, which have been taken in a divided manner, and therefore there is no need to fix the camera with a tripod while taking the images in a divided manner. Furthermore, there is no need for any exclusive-use equipment for accurately controlling the position and orientation of the camera. Thus, the correction condition for a plurality of projectors can be easily obtained at low cost under alleviated imaging conditions.

Furthermore, by devising the configuration of the scenes, grating patterns of a plurality of projectors can be taken in a divided manner, and therefore even if the number of screens in multi-projection increases, it is possible to avoid the restriction (of the position of the camera) in the depth direction when taking an image with a camera. Furthermore, when the requirements are not strict with respect to the depth direction when taking images with the camera, by increasing the number of screens to be fit in the angular field of the camera, it is possible to reduce the number of times of taking images for calibration, such that the man-hour for the calibration operation by the user can be reduced.

As described above, according to an embodiment of the present invention, a projection system, an image processing device, and a projection method are provided, by which in the projection system for projecting images on a projection body by a plurality of projection units, the conditions for correcting images to be projected from the plurality of projection units can be obtained under alleviated imaging conditions.

Note that the above functional units can be realized by a computer-executable program described in a legacy programming language such as assembler, C, C++, C#, Java (registered trademark), or an object oriented programming language, and may be distributed by being stored in a device-readable recording medium such as ROM, EEPROM, EPROM, a flash memory, a flexible disk, CD-ROM, CD-RW, DVD-ROM, DVD-RAM, DVD-RW, a Blu-ray disc, an SD card, an MO, or through an electric communication line. Furthermore, part of or all of the above functional units may be implemented on as programmable device (PD) such as a field programmable gate array (FPGA), or may be implemented as ASIC (application specific integrated circuit), and may be distributed by a recording medium as circuit configuration data (bit stream data) to be downloaded to the PD for realizing the functions on the PD, and data described in HDL (Hardware Description Language), VHDL (VHSIC (Very High Speed Integrated Circuits) Hardware Description Language)), and Verilog-HDL for generating the circuit configuration data.

According to one embodiment of the present invention, in a projection system for projecting an image on a projection body by a plurality of projection units, the correction condition for an image to be projected from the plurality of projection units, can be obtained under alleviated imaging conditions.

The projection system, the image processing device, and the projection method are not limited to the specific embodiments described herein, and variations and modifications may be made without departing from the spirit and scope of the present invention.

The present application is based on and claims the benefit of priority of Japanese Priority Patent Application No. 2013-155719, filed on Jul. 26, 2013, the entire contents of which are hereby incorporated herein by reference.

What is claimed is:

1. A projection system, comprising:
a plurality of projection units configured to project an image on a projection body;
a taken image preparation unit configured to prepare a plurality of calibration-use images;
an extraction unit configured to extract, from each of the plurality of calibration-use images, at least grating points indicating a distortion in a projected image of one of the plurality of projection units and alignment points of the projected image of the one of the plurality of projection units or a projected image of another one of the plurality of projection units;
a conversion unit configured to convert, onto a common coordinate system, the grating points of the projected images of the plurality of projection units extracted from the plurality of calibration-use images by the extraction unit, based on alignment points common to the plurality of calibration-use images;
a geometric correction coefficient calculation unit configured to calculate a geometric correction coefficient for providing a projection image to be projected from the plurality of projection units, based on the grating points on the common coordinate system;
an image output unit configured to output, to at least one of the plurality of projection units, a calibration image including both of or one of a grating pattern defining grating points of the projected image and an alignment pattern defining alignment points between the plurality of calibration-use images; and
a scene preparation unit configured to prepare a plurality of calibration projection scenes each including the calibration image to be output to at least one of the plurality of projection units, such that
(a) in an arrangement of the projected images, projection units adjacent to each other among the plurality of projection units do not both project a grating pattern in the same calibration projection scene,
(b) all of the plurality of calibration projection scenes include at least one grating pattern of the plurality of projection units, and
(c) the plurality of calibration projection scenes constitute a tree structure by a connection based on an alignment pattern projected by one of the plurality of projection units common to the plurality of calibration projection scenes.

2. The projection system according to claim 1, wherein the scene preparation unit prepares one or more of the plurality of calibration projection scenes, such that in an arrangement of the projected images, one of the projection units adjacent to each other projects at least a grating pattern, and another one of the projection units adjacent to each other projects an alignment pattern, and the scene preparation unit prepares a last one of the plurality of calibration projection scenes, such that a last one of the plurality of projection units projects both of a grating pattern and an alignment pattern.

3. The projection system according to claim 1, wherein the scene preparation unit prepares a first one of the plurality of calibration projection scenes, such that in an arrangement of the projected images, projection units in a first group among the plurality of projection units project at least a grating pattern, the scene preparation unit prepares a second one of the plurality of calibration projection scenes, such that projection units in a second group among the plurality of projection units, which are each adjacent to one of the projection units in the first group, project at least a grating pattern, and the scene preparation unit prepares the first one and the second one of the plurality of calibration projection scenes, such that at least a common one of the plurality of projection units, which is common to the first one and the second one of the plurality of calibration projection scenes, projects an alignment pattern.

4. The projection system according to claim 1, wherein the alignment pattern is arranged at a peripheral position of an area where the grating pattern is arranged, in the projected image.

5. The projection system according to claim 1, wherein the conversion unit performs projection conversion based on a coordinate of an alignment pattern common to a first calibration-use image and a second calibration-use image among the plurality of calibration-use images prepared by the taken image preparation unit, the projection conversion being performed for converting the grating points from a coordinate system of the second calibration-use image to a coordinate system of the first calibration-use image.

6. The projection system according to claim 1, further comprising:
a blending coefficient calculation unit configured to detect, for each of the plurality of projection units, an overlapping area between a projected image of a target projection unit and a projected image of an adjacent projection unit adjacent to the target projection unit, and calculate a blending coefficient for adjusting an overlapping amount between the projected image of the target projection unit and the projected image of the adjacent projection unit.

7. The projection system according to claim 6, further comprising:
a correction processing unit provided for each of the plurality of projection units, the correction processing unit being configured to
generate an intermediate image for each of the plurality of projection units from an image that is a target of projection, based on the geometric correction coefficient calculated by the geometric correction coefficient calculation unit, and
to calculate the projection image for each of the plurality of projection units from the intermediate image, based on the blending coefficient calculated by the blending coefficient calculation unit.

8. The projection system according to claim 1, further comprising:
both of or one of
a plurality of projection devices acting as the plurality of projection units; and an imaging device configured to take images of the plurality of calibration-use images.

9. An image processing device for performing projection with the use of plurality of projection units, the image processing device comprising:
a taken image preparation unit configured to prepare a plurality of calibration-use images;
an extraction unit configured to extract, from each of the plurality of calibration-use images, at least grating points indicating a distortion in a projected image of one of the plurality of projection units and alignment points of the projected image of the one of the plurality of projection units or a projected image of another one of the plurality of projection units;
a conversion unit configured to convert, onto a common coordinate system, the grating points of the projected images of the plurality of projection units extracted from the plurality of calibration-use images by the extraction unit, based on alignment points common to the plurality of calibration-use images; and
a geometric correction coefficient calculation unit configured to calculate a geometric correction coefficient for providing a projection image to be projected from the plurality of projection units, based on the grating points on the common coordinate system, wherein
the extraction unit extracts, from each of the plurality of calibration-use images, both of or one of the grating points and the alignment points, wherein each of the plurality of calibration-use images includes at least one calibration-use projected image including both of or one of a grating pattern defining grating points of the projected image and an alignment pattern defining alignment points between the plurality of calibration-use images, and
the taken image preparation unit prepares the plurality of calibration-use images each including the at least one calibration-use projected image projected from at least one of the plurality of projection units, such that
(a) in each of the plurality of calibration-use images, in an arrangement of the projected images, grating patterns projected by projection units adjacent to each other among the plurality of projection units are not both included,
(b) all of the plurality of calibration-use images include at least one grating pattern of the plurality of projection units, and
(c) the plurality of calibration-use images constitute a tree structure by a connection based on an alignment pattern, which is projected by one of the plurality of projection units common to the plurality of calibration-use images and whose image is taken.

10. A projection method of projecting an image on a projection body by a plurality of projection units, the projection method comprising:
preparing, by a computer, a plurality of calibration-use images;
extracting, by the computer, from each of the plurality of calibration-use images, at least grating points indicating a distortion in a projected image of one of the plurality of projection units and alignment points of the projected image of the one of the plurality of projection units or a projected image of another one of the plurality of projection units;
converting, by the computer, onto a common coordinate system, the grating points of the projected images of the plurality of projection units extracted from the plurality of calibration-use images at the extracting, based on alignment points common to the plurality of calibration-use images;
calculating, by the computer, a geometric correction coefficient for providing a projection image to be projected from the plurality of projection units, based on the grating points on the common coordinate system converted at the converting;
projecting, by the plurality of projection units before the preparing the plurality of calibration-use images, a calibration image including both of or one of a grating pattern defining grating points of the projected image and an alignment pattern defining alignment points between the plurality of calibration-use images; and
preparing, before the projecting, a plurality of calibration projection scenes, such that
(a) in an arrangement of the projected images, projection units adjacent to each other among the plurality of projection units do not both project a grating pattern in the same calibration projection scene,
(b) all of the plurality of calibration projection scenes include at least one grating pattern of the plurality of projection units, and
(c) the plurality of calibration projection scenes constitute a tree structure by a connection based on an alignment pattern projected by one of the plurality of projection units common to the plurality of calibration projection scenes, wherein
the preparing the plurality of calibration-use images includes receiving input of the plurality of calibration-use images including a calibration-use projected image projected by at least one of the plurality of projection units.

11. The projection method according to claim 10, further comprising:
detecting, by the computer, for each of the plurality of projection units, an overlapping area between a projected image of a target projection unit and a projected image of an adjacent projection unit adjacent to the target projection unit;
calculating, by the computer, a blending coefficient for adjusting an overlapping amount between the projected image of the target projection unit and the projected image of the adjacent projection unit;
generating, by the computer, an intermediate image for each of the plurality of projection units from an image to be projected, based on the calculated geometric correction coefficient;
calculating, by the computer, the projection image for each of the plurality of projection units from the intermediate image, based on the blending coefficient calculated at the blending; and
projecting, by each of the plurality of projection units, the calculated projection image for each of the plurality of projection units.

* * * * *